United States Patent [19]

Hale et al.

[11] Patent Number: 6,141,697

[45] Date of Patent: *Oct. 31, 2000

[54] SYSTEM AND METHOD FOR PERFORMING EXTERNAL PROCEDURE CALLS IN HETEROGENEOUS COMPUTER SYSTEMS UTILIZING PROGRAM STACKS

[75] Inventors: J. Calvin Hale, Rancho Santa Margarita; Mark Joseph Rentmeesters, Irvine; Norman Roy Smith, Lake Forest, all of Calif.

[73] Assignee: Unisys Corp., Blue Bell, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/882,639

[22] Filed: Jun. 25, 1997

[51] Int. Cl.$^7$ ...................................................... G06F 9/46
[52] U.S. Cl. ............................................................ 709/312
[58] Field of Search .................................... 364/131, 134; 709/106, 310, 315, 330, 312; 395/676, 680, 683, 684

[56] References Cited

U.S. PATENT DOCUMENTS

| | | | |
|---|---|---|---|
| 4,297,743 | 10/1981 | Appell et al. | 364/200 |
| 4,722,048 | 1/1988 | Hirsch et al. | 364/200 |
| 4,862,354 | 8/1989 | Fiacconi et al. | 364/200 |
| 5,027,271 | 6/1991 | Curley et al. | 364/200 |
| 5,222,215 | 6/1993 | Chou et al. | 395/275 |
| 5,230,065 | 7/1993 | Curley et al. | 395/200 |
| 5,247,676 | 9/1993 | Ozur et al. | 395/650 |
| 5,329,619 | 7/1994 | Page' et al. | 395/200 |
| 5,339,422 | 8/1994 | Brender et al. | 395/700 |
| 5,511,197 | 4/1996 | Hill et al. | 395/700 |
| 5,590,331 | 12/1996 | Lewis et al. | 395/708 |
| 5,619,685 | 4/1997 | Schiavone | 395/500 |
| 5,619,710 | 4/1997 | Travis, Jr. et al. | 395/800 |

OTHER PUBLICATIONS

Aho, "Compilers Principles, Techniques, and Tools," Bell Telephone Laboratories, Incorporated, pp. 404–427 and 522–529, Mar. 1988.

*Primary Examiner*—Alvin E. Oberley
*Assistant Examiner*—Gary S. Fourson
*Attorney, Agent, or Firm*—J. Ronald Richebourg; Mark T. Starr; Steven B. Samuels

[57] ABSTRACT

A method is disclosed for performing function calls from a first program operating under control of a first operating system running on a first CPU; to a second program operating under control of a second operating system running on a second CPU. The method operates in a heterogeneous multiprocessing system having a common memory accessible by each of the CPU's and disposed for storing the two different operating systems that actively run and control resources of the system. The method begins by initiating the second program. The first program then makes calls to the second program to perform a specific function while passing parameters thereto for processing according to the specific function. The second program processes the parameters according to the function; and, converts the results from a format compatible with the second program to a format compatible with the first program. The second program reactivates the first program for receipt of the results and once received the first program signals the second operating system to terminate operation.

21 Claims, 32 Drawing Sheets

SYSTEM AND METHOD FOR PERFORMING EXTERNAL PROCEDURE CALLS IN HETEROGENEOUS COMPUTER SYSTEMS UTILIZING PROGRAM STACKS

CROSS REFERENCE TO RELATED APPLICATIONS

This application relates to the following co-pending applications, assigned to the same assignee hereof, which are incorporated herein by reference.

U.S. Ser. No. 08/882,640, entitled A SYSTEM AND METHOD FOR PERFORMING EXTERNAL PROCEDURE CALLS FROM A CLIENT PROGRAM TO A SERVER PROGRAM WHILE BOTH ARE RUNNING IN A HETEROGENEOUS COMPUTER;

This is a continuation application of U.S. Ser. No. 08/882,639, entitled A NEW AND IMPROVED SYSTEM AND METHOD FOR PERFORMING EXTERNAL PROCEDURE CALLS IN HETEROGENEOUS COMPUTERS, filed Jun. 25, 1997, and by the same inventors hereof.

U. S. Serial No. 08/882,634, now abandoned entitled A SYSTEM AND METHOD FOR PERFORMING EXTERNAL PROCEDURE CALLS FROM A SERVER PROGRAM TO A CLIENT PROGRAM WHILE BOTH ARE RUNNING IN A HETEROGENEOUS COMPUTER;

U.S. Ser. No. 08/882,643, entitled A SYSTEM AND METHOD FOR PERFORMING EXTERNAL PROCEDURE CALLS FROM A CLIENT PROGRAM TO A SERVER PROGRAM AND BACK TO THE CLIENT PROGRAM WHILE BOTH ARE RUNNING IN A HETEROGENEOUS COMPUTER.

FIELD OF THE INVENTION

The present invention generally relates to external procedure calls in a computer system executing a program, and in particular to a method for performing external procedure calls from one central processing unit ("CPU") to another CPU, wherein each share a common memory in a heterogeneous environment. The term "External Procedure Calls" (or "EPC") is used herein to refer to the making of a function call from one operating environment to another of such a heterogeneous computer system. The term "heterogeneous multiprocessing system" refers to a single computer system having two or more Central Processing Units (CPUs that operate with a shared memory and utilize two or more different operating systems.

BACKGROUND OF THE INVENTION

In general computer programs include a number of internal functions, plus computer codes that call these functions in a specific order. This approach works well when all of the necessary functions are available within a single program. However, there are times when a required function is located elsewhere. Such functions are normally referred to as remote, or external functions.

One way to make these remote or external functions available to a program is to incorporate them into the local program. When feasible, this is the most efficient approach. However, remote or external functions sometimes depend upon other things (e.g., data, operating systems, hardware, etc.), which may not be available to the local program. In such situations, importing the remote or external function to the local program is not possible. Hence, the only alternative is to invoke the desired function remotely. These are known as Remote Procedure Calls (RPC's), which are available for such use. RPC's operate much, much slower than internal functions, in fact they are four or more orders of magnitude slower.

Some systems provide a streamlined RPC mechanism for use in shared memory environments, which are referred to as Local Procedure Calls (LPC). This capability eliminates the overhead of moving a function call across a network and reduces the per call overhead to less than 1 microsecond with today's microprocessors. Local Procedure Calls, however, are only available when all of the functions are running under the control of one single operating system. In a heterogeneous multiprocessing (HMP) system, there is a desire to have two different operating systems closely cooperating to carry out certain tasks.

Technologies are available for carrying out this cooperation, which are variants of Remote Procedure Calls (RPCs). RPCs operate over a network transport of some sort, and serve to physically move a request from one environment to another. At best, they operate in the range of 100 microseconds overhead per call. While this overhead is acceptable for some long operations, it is excessive for short operations, making cooperation impractical. In addition, the 100 microsecond or greater overhead must be incurred by each function call, further reducing the desirability of RPCs. A function calling sequence with drastically reduced overhead is required.

In shared memory HMP environments, there is no need to physically move the function from the memory of one operating environment to the memory of the other. Both operating environments share a single memory. External Procedure Calls (EPC) take advantage of this fact to expedite the calling sequence between operating environments, allowing overheads of less than 1 microsecond using today's Instruction Processors (IPs). This overhead reduction allows EPCs to be used for cooperative processing where RPCs would be impractical.

SUMMARY OF THE INVENTION

In accordance with the above and other objects, features and advantages of the present invention, there is provided a method for performing function calls from a first program operating under control of a first operating system, and running on a first CPU to a second program operating under control of a second operating system and running on a second CPU. The method operates in a heterogeneous multiprocessing system having a common memory accessible by each of the CPU's and disposed for storing the two different operating systems that actively run and control resources of the system. The method begins with the first program initializing the second program. After successful initiation, the first program makes calls to the second program to perform a specific function. The first program passes parameters to the second program for processing according to each specific function. The second program processes the parameters according to the function; and, then converts the results from a format compatible with the second program to a format compatible with the first program. The second program reactivates the first program for receipt of the results. Once calls are completed, the first program signals the second operating system to terminate operation.

An object of the present invention is to provide a direct calling sequence from a program running in one operating system environment to another program running in another operating system environment, which includes the direct mapping of parameters and return values.

Another object of the present invention is to provide support for a wide variety of parameter types in the function calls.

A feature of the present invention allows for the return of result values from the called function to the calling program.

Another feature of the present invention allows for the calling program to also act in the role of a called program.

An advantage of the present invention allows calls to be initiated to more than one Server Program that may be operating under the control of more than one other operating system and running on one or more additional CPUs, all within the same heterogeneous multiprocessing system.

Another advantage of the present invention is that it can operate with an efficiency of less than one order of magnitude (10×) greater than the efficiency of calling the same function if it resided completely within the Client Program, all under the control of the first operating system.

Yet another feature of the present invention is that the Client and Server Programs are declared and used in the same fashion as Remote Procedure Calls are used. This means that the callable functions are declared in an Interface Definition Language that is processed by an IDL compiler to produce skeleton Client and Server Programs, which are then completed by a programmer and compiled with an appropriate compiler for their respective target operating system and CPU.

By use of the present invention, modern computers can execute in excess of 1,000,000 External Procedure Calls per second, using the ClearPath HMP systems available from Unisys Corporation, assignee of this patent application. These speeds are well within one order of magnitude of local function calls, and are a full three orders of magnitude faster than the prior art Remote Procedure Calls. This speed allows programmers to use remote or external functions for many more purposes than were possible using standard Remote Procedure Calls.

Still other objects, features and advantages of the present invention will become readily apparent to those skilled in the art from the following detailed description, wherein there is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the spirit and scope of the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION

Figure 1:
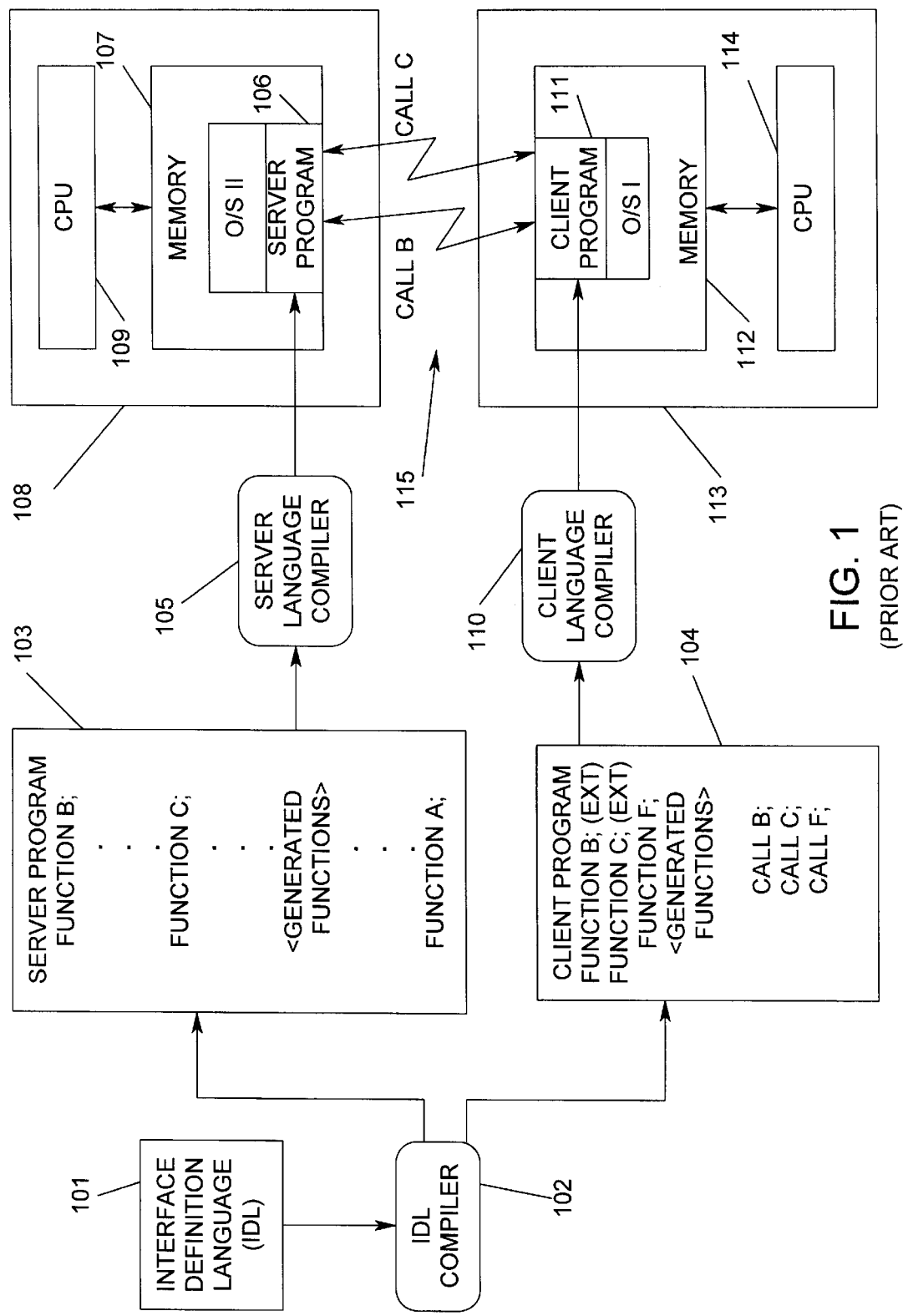
FIG. 1 is a block diagram of the software modules of the prior art remote procedure call schema.

Referring now to FIG. 1, a block diagram illustrates the computer system and software modules making up the prior art remote procedure call schema. Remote or external functions are first identified through an Interface Definition Language (IDL block 101), which is processed by an IDL compiler 102 to produce two program skeletons for exemplary Functions B and C: i.e., a Server Program skeleton 103 and a Client Program skeleton 104. The Server Program skeleton 103 contains declarations for the remote or external functions (Functions B and C in this example), plus additional Generated Functions that allow the remote or external functions to be accessed remotely. A computer programmer adds computer codes to the Server Program to provide the actual workings of each remote or external function (e.g., Functions B and C). The computer programmer may also add additional functions that are not remotely or externally callable (e.g., Function A). The resulting program is then compiled with a server language compiler 105 to produce an executable Server Program 106 stored in a memory 107 of a computer 108 having a CPU 109 coupled thereto. An Operating System (O/S II) for the CPU 109 is also stored in the memory 107 and controls operation of the CPU 109, the memory 107 and the Server Program 106.

The Client Program skeleton 104 contains declarations for the remote or external functions as well, with indications that they are remote or external (again, Functions B and C). The Client Program skeleton 104 also contains generated functions to allow the remote or external functions to be accessed remotely. A computer programmer adds codes to the Client Program skeleton 104 to provide the actual workings of the program itself, including calls to the remote or external functions (for example, statements CALL B and CALL C). The computer programmer may also add additional functions that are accessed locally (e.g., Function F). The resulting program is then compiled with a client language compiler 110 to produce an executable Client Program 111 stored in a memory 112 of a computer 113 having a CPU 114 coupled thereto. Another Operating System (O/S I) for the CPU 114 is also stored in the memory 112 and controls operation of the CPU 114, the memory 112 and the Client Program 111.

At this stage, the programs are ready for execution. The Client Program 111 is started on the computer 113 under the control of O/S I. The Server Program 106 is started on the computer 108 under the control of the operating system O/S II. The mechanisms for starting each program are specific to the computers on which they run; and, since such mechanisms are well known in the art, will not be further described herein. It is pointed out that each computer could be using entirely different operating systems, comprising entirely different hardware, utilizing entirely different CPUs and instruction sets, and having access to entirely different hardware and software resources.

When the Client Program 111 calls one of the remote or external functions (e.g., CALL B), the Generated Functions intercept the CALLS and transport them to the computer 108, via a network 115, where the Server Program 106 is running. Then, using the Generated Functions of the Server Program 106, the remote or external function is invoked in the Server Program 106. When the invoked function is finished, any results are returned to the Client Program 111 in a like manner. The Generated Functions are obliged to communicate over the network 115 between the two computers; and, are obliged to perform any data translations and network protocols necessary to transport call requests, parameters and responses from one computer to the other.

There is a problem with the previously described solution. When a function is called locally within a program, the overhead necessary to make the function call is several CPU instructions in length. (Note that today's CPUs can execute tens of millions of function calls per second.) When a function is remote or external, the Generated Functions have a large amount of work to do. This work becomes an integral part of the function invocation, which is overhead that takes thousands of CPU instructions, plus transmission delays. The result is that today's computers can execute on the order of 50 to 1,000 remote or external function calls per second. Thus, remote or external function calls operate around four orders of magnitude slower than local function calls. This makes remote or external function calls impractical for many applications.

Figure 2:
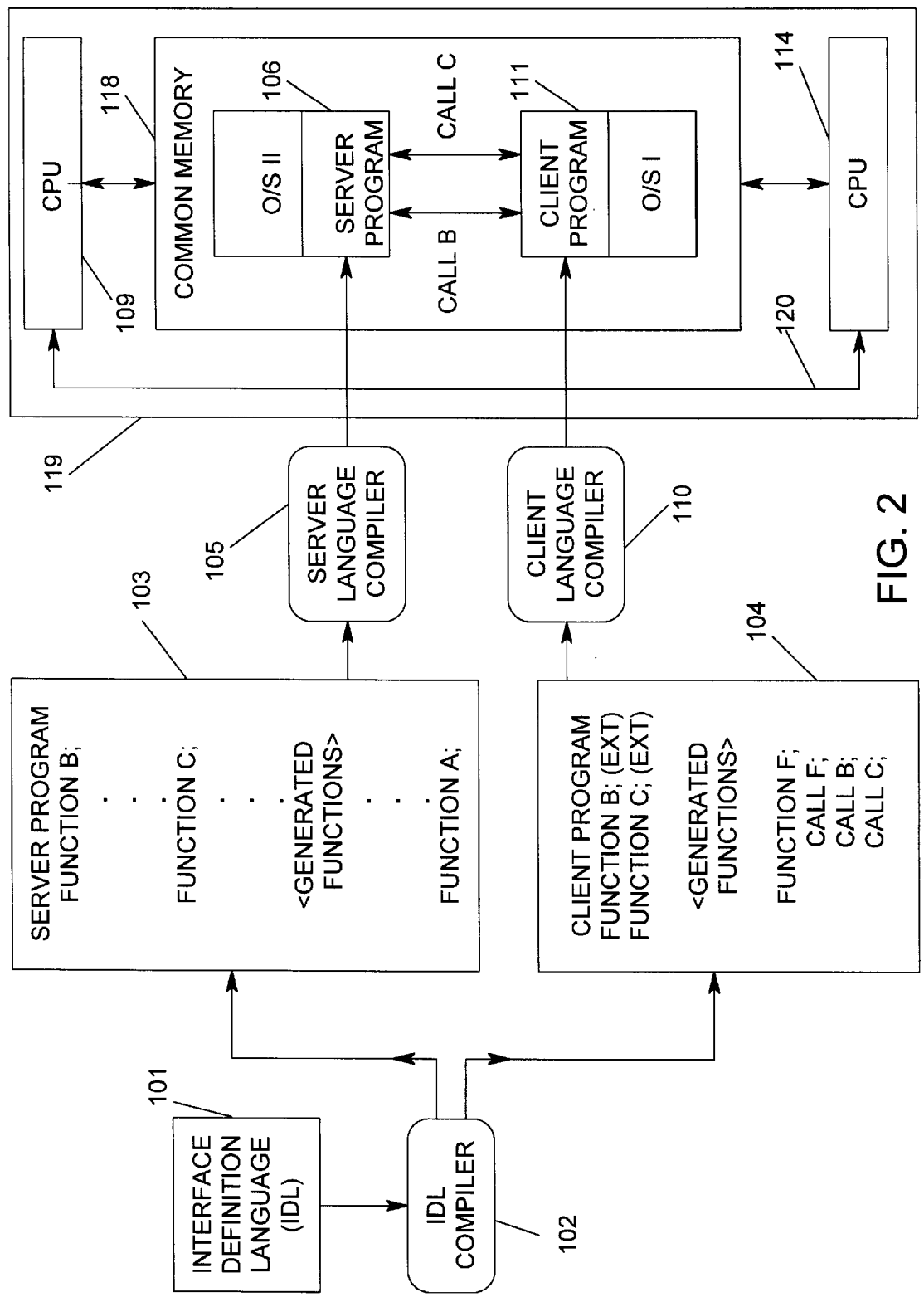
FIG. 2 is a block diagram that illustrates software modules depicting the sequence of steps necessary to develop programs that could make use of the method of the present invention.

Referring now to FIG. 2, a block diagram illustrates the sequence of steps necessary to develop programs that could make use of the method of the present invention. External Procedure Calls begin with the same basic approach as Remote Procedure Calls. The same Interface Definition Language 101 is used, and the same IDL compiler 102 generates a Server Program skeleton 103, and a Client Program skeleton 104. There are differences however in the Generated Functions, but these differences are transparent to the computer programmer. The computer programmer performs the identical steps of completing each program, and compiling it using the same appropriate language compiler 105 or 110. The resulting programs 106 and 111, respectively, are then run on a Heterogeneous Multiprocessing System, which is a special computer system 119 having two or more operating systems (O/S I and O/S II) controlling two or more CPU's (CPU 114 and CPU 109) connected in a very closely coupled way by means of a bus 120. A suitable example of such a system is the ClearPath HMP Systems manufactured and sold by Unisys Corporation, assignee of this patent application. The only special requirements for such a computer system are that it must incorporate a shared memory 118 between the Operating Systems, and there must be a high-speed CPU-to-CPU signaling bus available, such as the bus 120.

When the Client Program 111 calls a remote or external function using External Procedure Calls, the Generated Functions operate to invoke the appropriate Server function at very nearly the same speed as if the function was a local one. This is accomplished while still allowing the Operating Systems involved to be different, allowing entirely different hardware, utilizing entirely different CPUs and instruction sets, and having access to entirely different hardware and software resources. Only the two special requirements of a common memory and the high-speed CPU-to-CPU signaling bus 120 need to be satisfied.

Remote or external functions are first identified through an Interface Definition Language (IDL block 101). This input is processed by an IDL compiler 102 to produce two program skeletons for exemplary Functions B and C: i.e., a Server Program skeleton 103 and a Client Program skeleton 104. The Server Program skeleton 103 contains declarations for the remote or external functions (Functions B and C in this example), plus additional Generated Functions that allow the remote or external functions to be accessed remotely.

In the disclosed embodiment, the Generated Functions include Stub Procedures, which are specific examples of the Generated Functions referenced in both the Server and Client Program skeletons 103 and 104, respectively; and, are Server Program procedures that convert the parameter and result data between O/S I (CPU 114) and O/S II (CPU 109) formats and call the appropriate Server Procedures. It is pointed out that one skilled in the art who reads this patent is able to develop Client Program procedures that convert the parameter and result data between O/S II (CPU 109) and O/S I (CPU 114).

A computer programmer adds computer codes to the Server Program to provide the actual workings of each remote or external function (e.g., Functions B and C) The computer programmer may also add additional functions that are not remotely or externally callable (e.g., Function A). The resulting program is then compiled with a server language compiler 105 to produce an executable Server Program 106 stored in the common memory 118 of a Heterogeneous Multiprocessing System 119 having a CPU 109 coupled thereto. Operating system O/S II for the CPU 109 is also stored in the common memory 118 and controls operation of the CPU 109, a portion of the common memory 118 and the Server Program 106.

Server skeletons are depicted as Server Programs in FIGS. 1 and 2 and contain the Server Procedure headings and empty bodies. Server Procedure headings and empty bodies are shown in FIGS. 1 and 2 as FUNCTION B and FUNCTION C, respectively, inside the Server Program skeleton 103. The application programmer is responsible for providing the logic within the procedure bodies, which is then referred to as a Server Procedure.

The Client Program skeleton 104 contains declarations for the remote or external functions as well, with indications that they are remote or external (again, Functions B and C). The Client Program skeleton 104 also contains Generated Functions to allow the remote or external functions to be accessed remotely. In this embodiment, the Generated Functions include Proxy Procedures, which are specific examples of the Generated Functions referenced in both the Server and Client Program skeletons 103 and 104, respectively; and are Client Program procedures that the Client Program calls when it wishes to invoke a Server Program function. They have the same parameters and procedure types as the procedures defined in the IDL specification. The Proxy Procedure calls an appropriate Protocol Procedure, which is responsible for notifying the O/S II that a function in the Server Program is to be called.

A computer programmer adds codes to the Client Program skeleton 104 to provide the actual workings of the program itself, including calls to the remote or external functions (for example, statements CALL B and CALL C). The computer programmer may also add additional functions that are accessed locally (e.g., Function F). The resulting program is then compiled with a client language compiler 110 to produce an executable Client Program 111 stored in the common memory 118 of a Heterogeneous Multiprocessing System 119 having another CPU 114 coupled thereto. Operating system O/S I for the CPU 114 is also stored in the common memory 118 and controls operation of the CPU 114, a portion of the common memory 118 and the Client Program 111.

At this stage, the programs are ready for execution. The Client Program 111 is started on the Heterogeneous Multiprocessing System 119 under control of the O/S I. The Server Program 106 is started on the Heterogeneous Multiprocessing System 119 under control of the O/S II. The mechanisms for starting each program are specific to the operating systems on which they run; and, since they are well known in the art, will not be described further herein. It is pointed out that the Heterogeneous Multiprocessing System could be using entirely different operating systems, comprising entirely different hardware, utilizing entirely different CPUs and instruction sets, and having access to entirely different hardware and software resources, except that they must operate with a common memory.

In one embodiment of the present invention, an additional type of procedure is provided in the Generated Functions for use by the Proxy and Stub Procedures. It is the Protocol Procedure, which is an additional Generated Function in the Client Program skeleton 104. The Protocol Procedures embody the specific mechanisms used to pass information between the CPU 114 and the CPU 109 in the heterogeneous multiprocessing system 119, and serve as the mechanism by which the Client Program can notify the O/S II that the Server Program function is about to be called.

Figure 3:
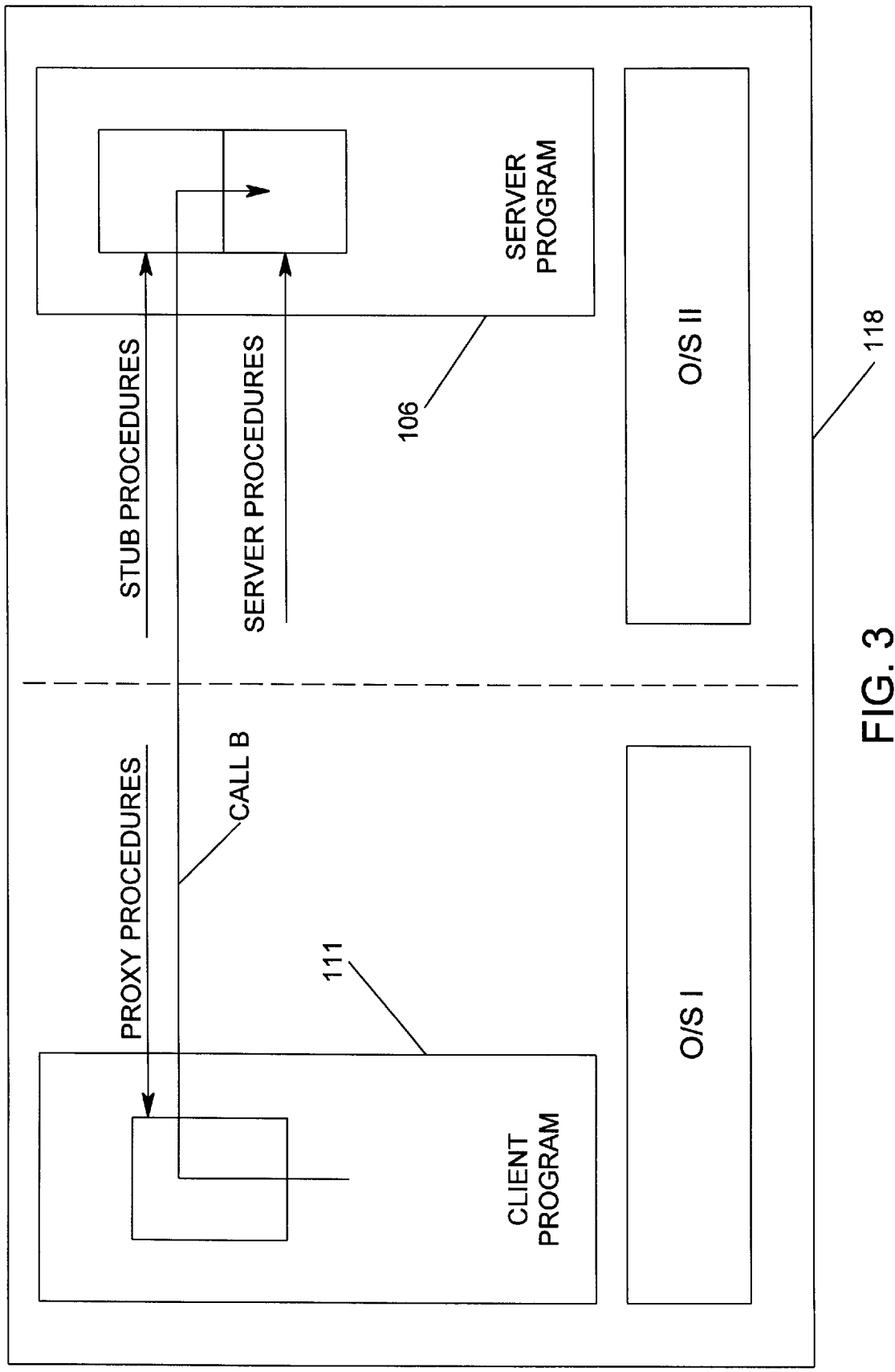
FIG. 3 is another block diagram of the software modules of the schema of the present invention that illustrates the operation of external procedure calls at run-time.

Referring now to FIG. 3, there is illustrated a block diagram of the software modules of the schema of the present invention stored in the common memory 118. This diagram represents a run-time composition of the Server Program 106 and the Client Program 111 for external procedure calls, as well as the sequence of operations for procedure calls from the Client Program to the Server Program.

In operation, when the Client Program 111 wishes to call a Server Program 106 function (for example, CALL B), the Client Program 111 instead calls the corresponding Proxy Procedure for Function B (CALL B). This Proxy Procedure notifies the O/S II that a Server Program 106 function is about to be called. The O/S II invokes the corresponding Stub Procedure in the Server Program 106. The Stub Procedure performs any parameter translation necessary, and calls the actual Server Function B. When the Server Function B completes processing, the Stub Procedure performs any parameter and return value translations necessary, and informs the O/S II to return control to the Client Program 111. The O/S II notifies the O/S I to resume the Client Program 111. The Client Program 111 then continues, making use of the parameters and result values from the Server Program 106 Function B. The details of this process are amplified in the description to follow and with reference to the flow chart illustrated in FIGS. 4A through 4F.

Figure 4A:
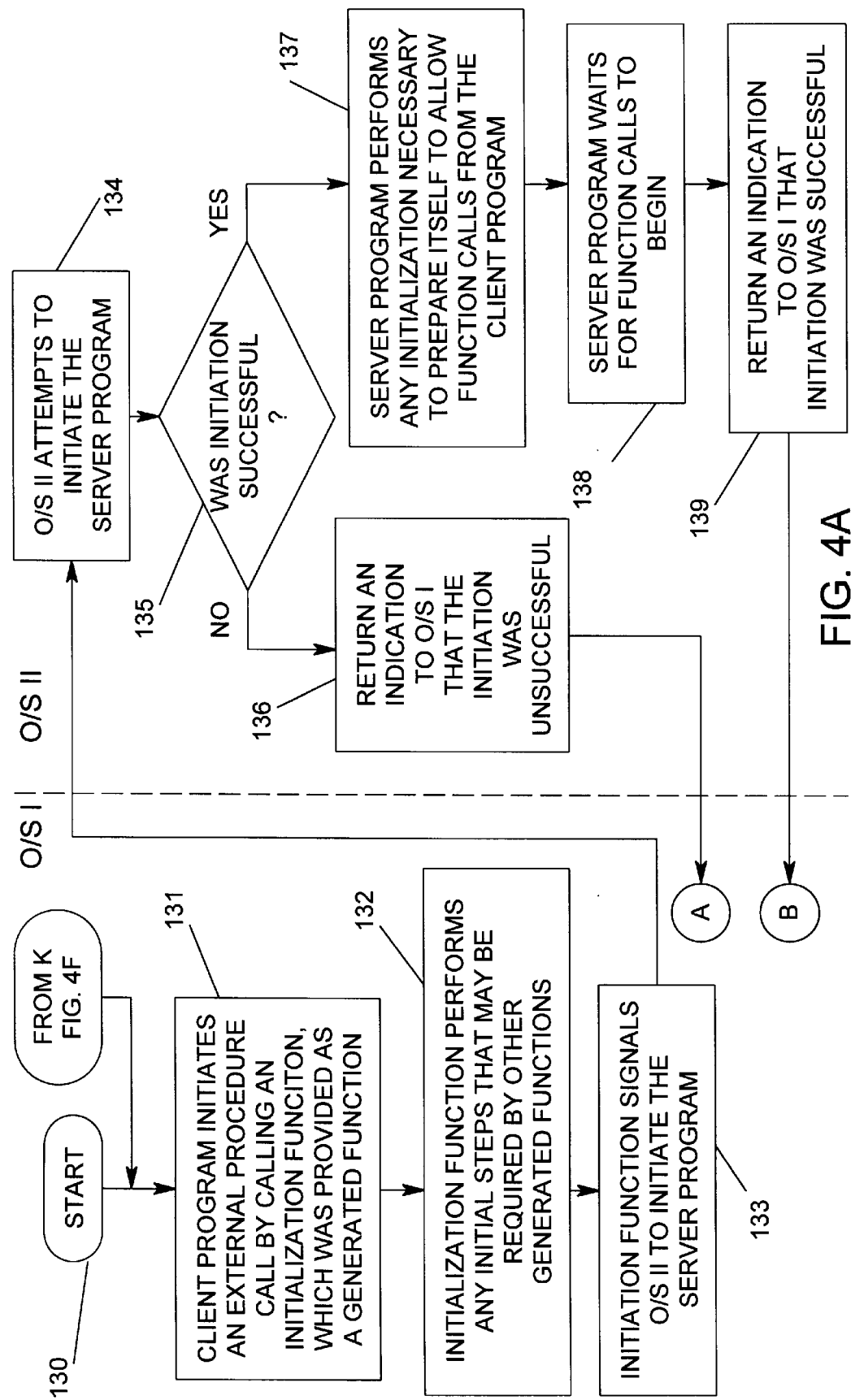
FIGS. 4A through 4F combined form a block diagram illustrating the steps of the method of the present invention.
Figure 7A:
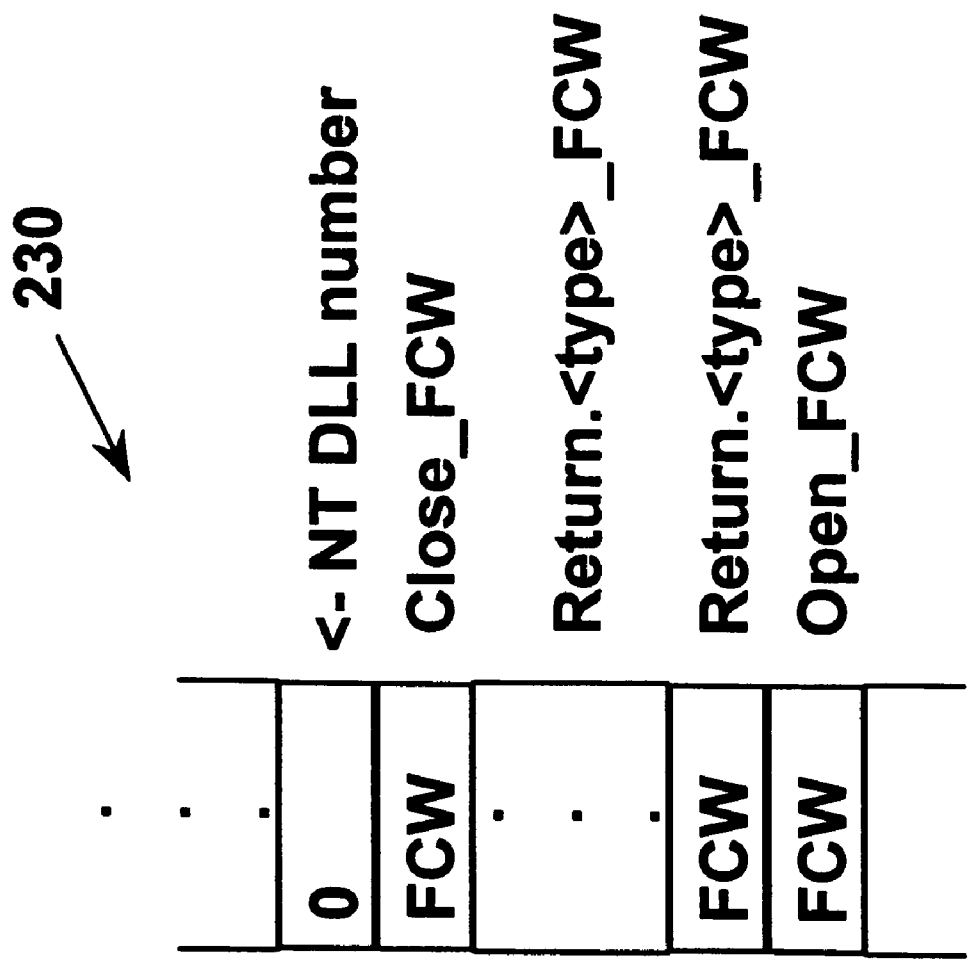
FIGS. 7A through 7W (intentionally excluding the letters O and I so as to avoid confusion) combined form a detailed sequence diagram illustrating operation of the method of the present invention, which corresponds to the method illustrated in FIGS. 4A through 4F.
Figure 7B:
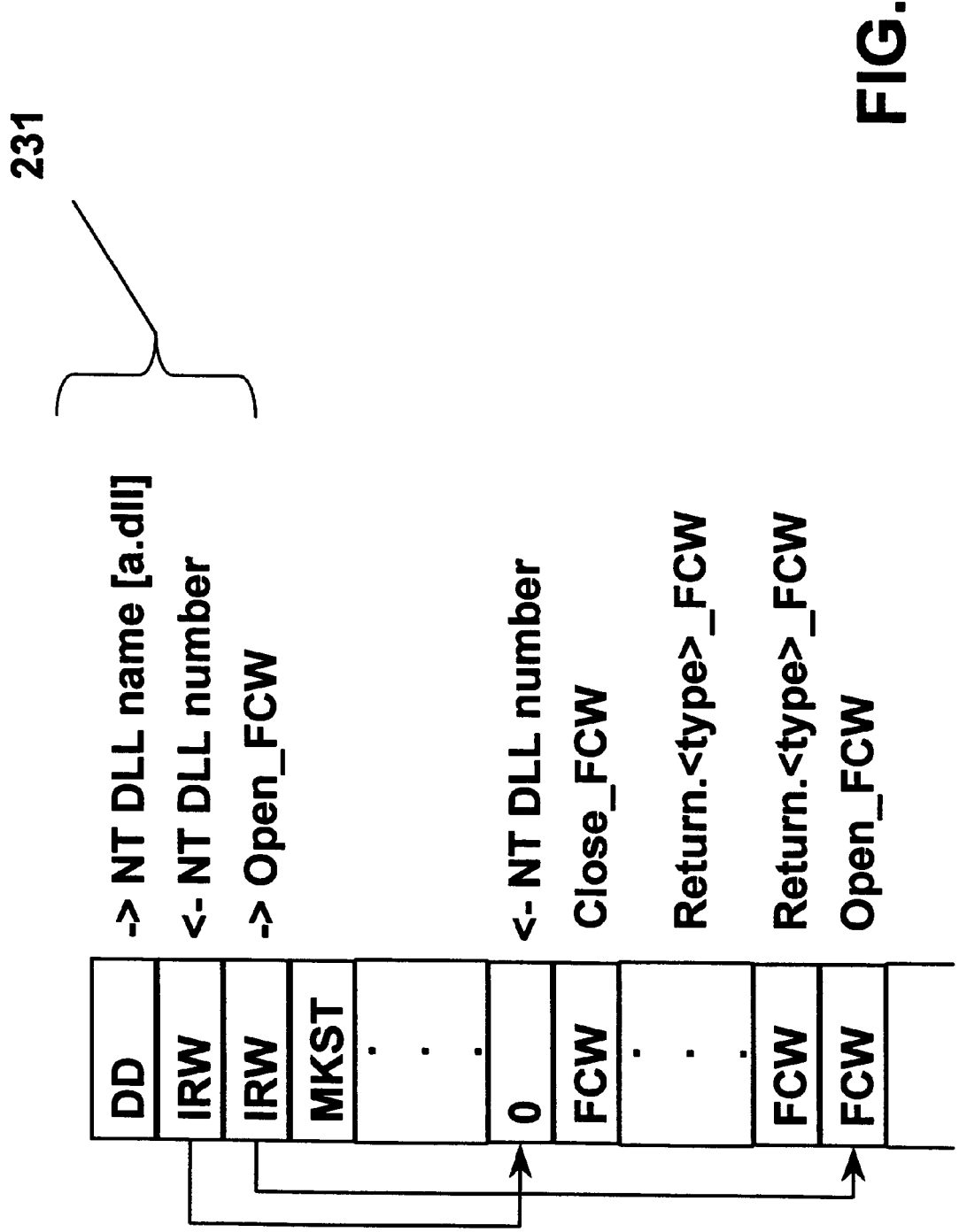

Referring now to FIG. 4A, the first of a six-part diagram of a flow chart of the method of the present invention is shown. A convention used in organizing these flow charts is to illustrate the steps performed by the first operating system (i.e., O/S I) on the left side of each sheet of the drawings and the steps performed by the second operating system (i.e., O/S II) on the right side of the sheet, unless otherwise noted. Referring also to FIG. 7A, the first of a twenty-one part diagram illustrating the steps of the preferred embodiment of the method of the present invention is shown. A convention used in organizing these figures is to illustrate the steps performed by the first operating system (i.e., O/S I) on the left-hand side of each sheet of the drawings and the steps performed by the second operating system (i.e., O/S II) on the right-hand side of the sheet, and within a border, unless otherwise noted. The process begins with a start bubble 130, and 230, FIG. 7A, followed by a step performed by the Client Program 111 of initiating an external procedure call by calling an initialization function that was provided as a Generated Function (block 131/231, FIG. 7B). This initialization function performs any initial steps that may be required by other Generated Functions (block 132). Next, the initialization function signals the O/S II to initiate the Server Program 106 (block 133/233, FIG. 7C).

Figure 7C:
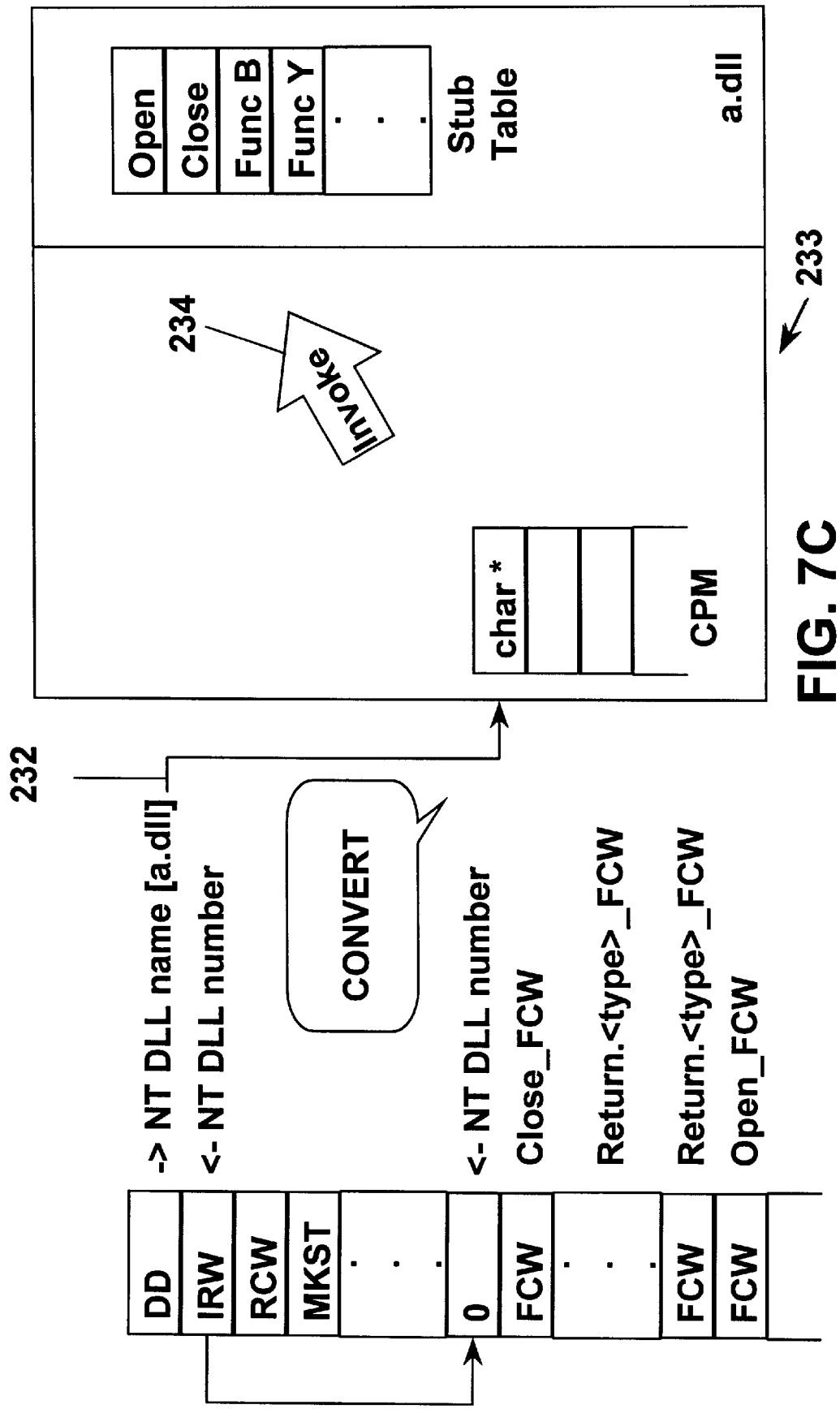
Figure 7D:
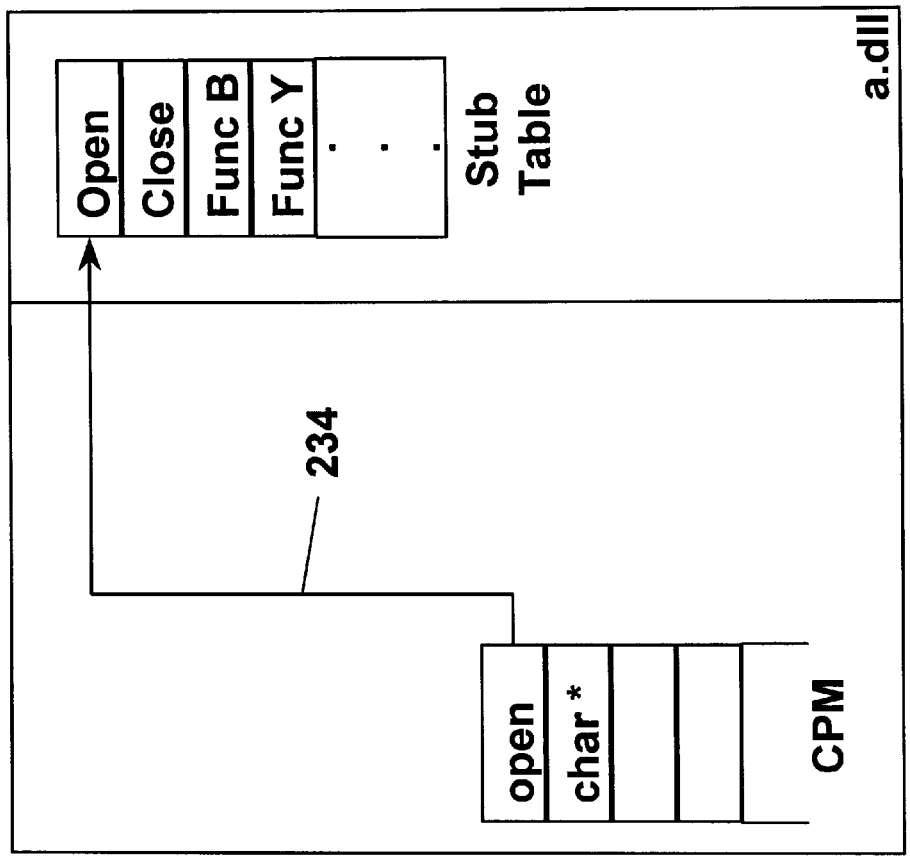
Figure 7D:
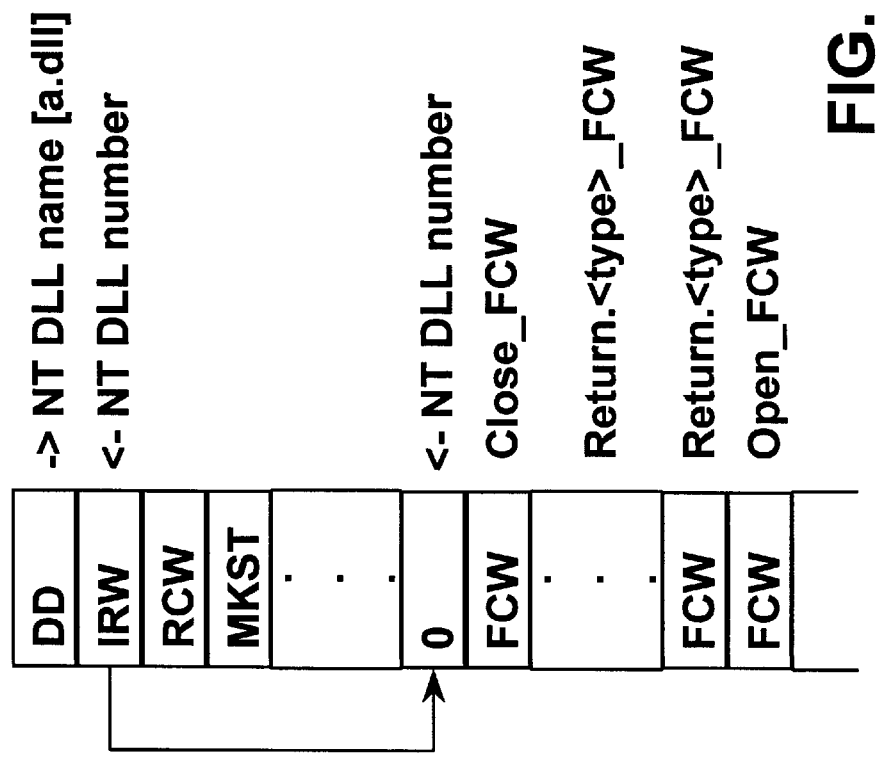
Figure 7E:
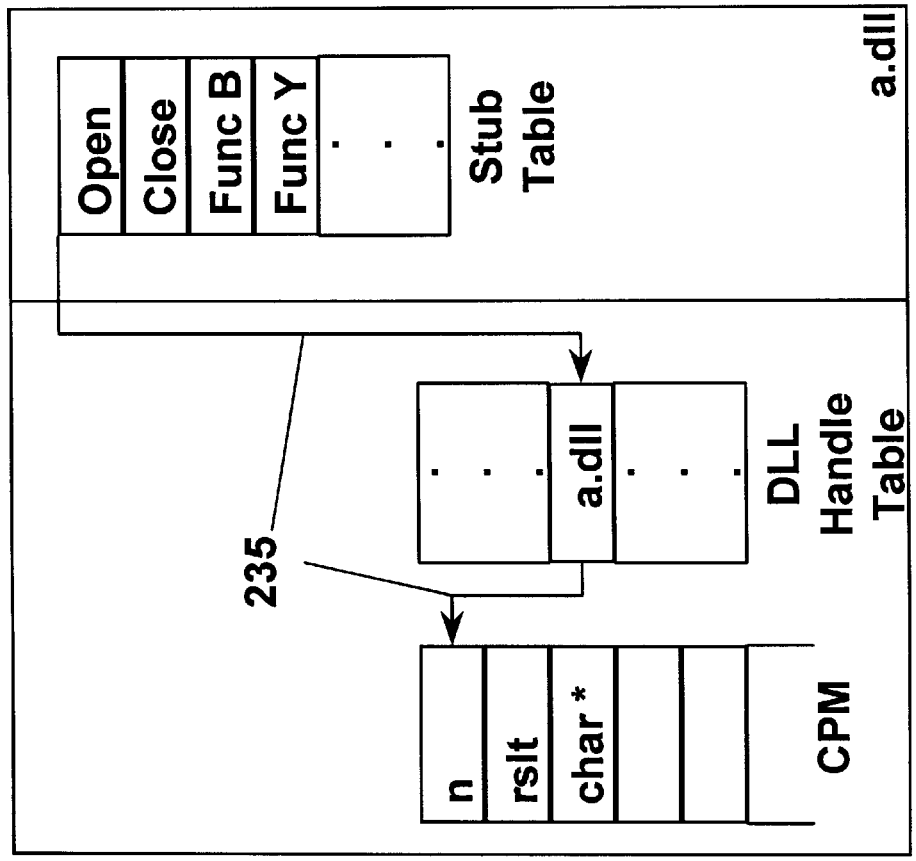
Figure 7E:
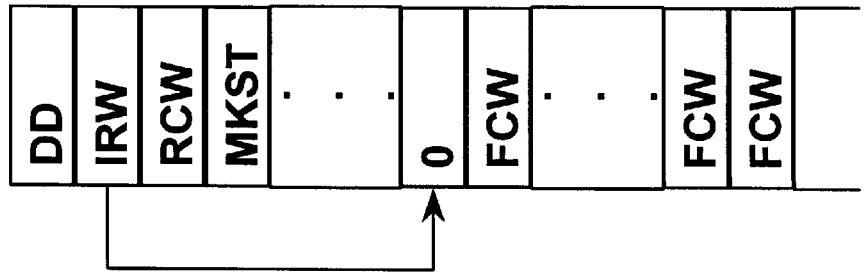
Figure 7F:
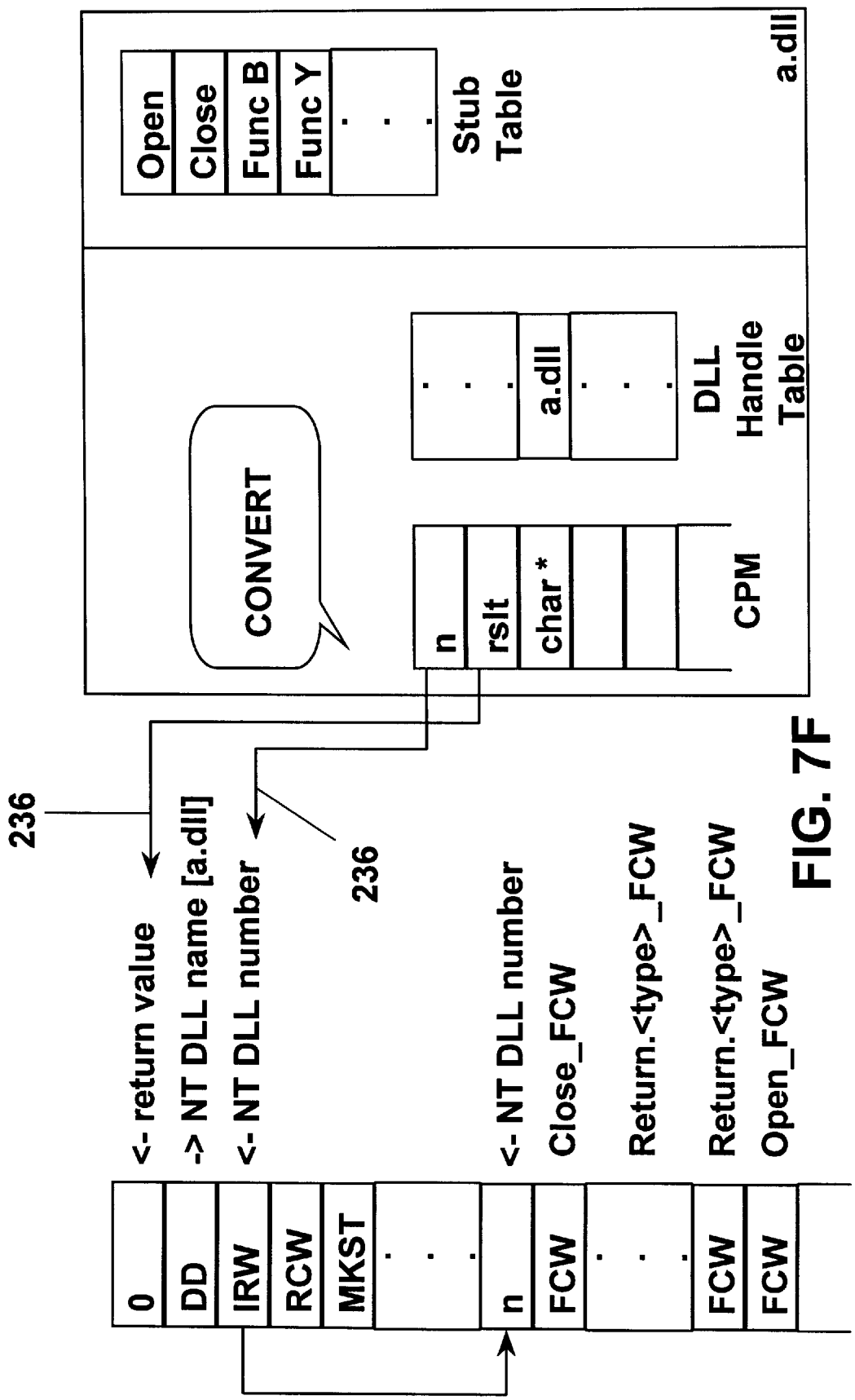
Figure 7G:
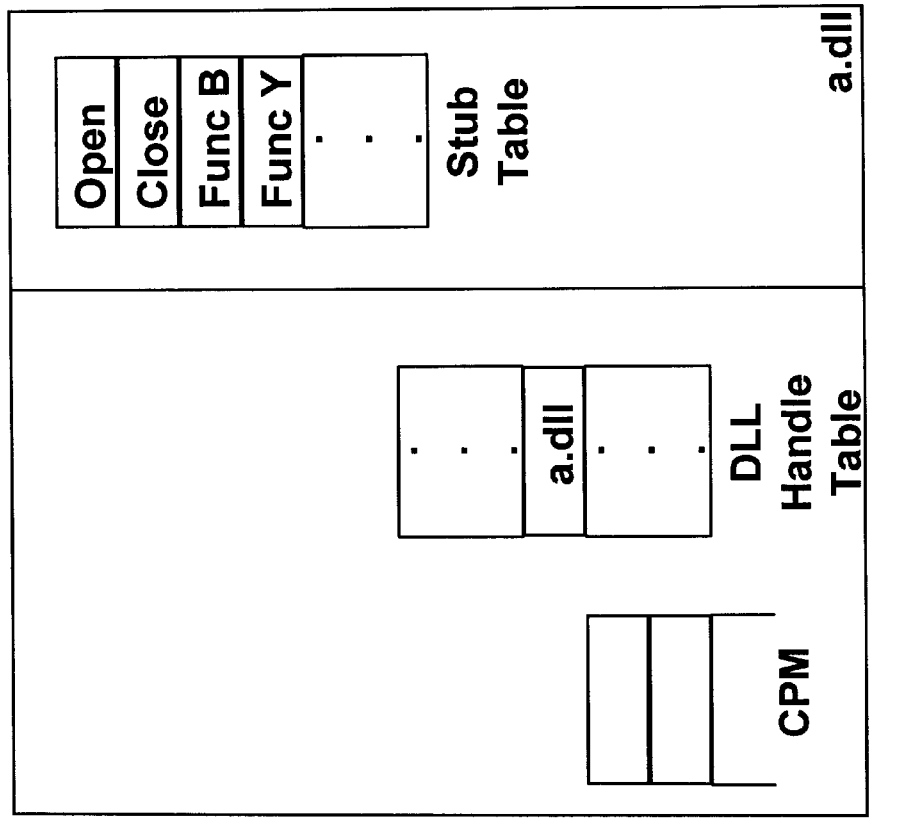

The O/S II attempts to initiate the Server Program 106 (block 134/234, FIGS. 7C and 7D). An inquiry is next made as to whether or not the initiation was successful (diamond 135/235, FIG. 7E). If the initiation was not successful, an indication to this affect is returned to the Client Program via O/S I (block 136/236, FIG. 7F). This return indication to the Client Program via O/S I is denoted by a connector A in FIG. 4A. On the other hand, if the initiation was successful, the Server Program 106 performs any initialization necessary to prepare itself to allow function calls from the Client Program 111 (block 137/237, FIG. 7F). The Server Program 106 then waits for function calls to begin (block 138). A return indication is sent to the Client Program via O/S I that the initiation was successful (block 139/239, FIG. 7F). The return indication to the Client Program via O/S I is denoted by a connector B in FIG. 4A.

Figure 4B:
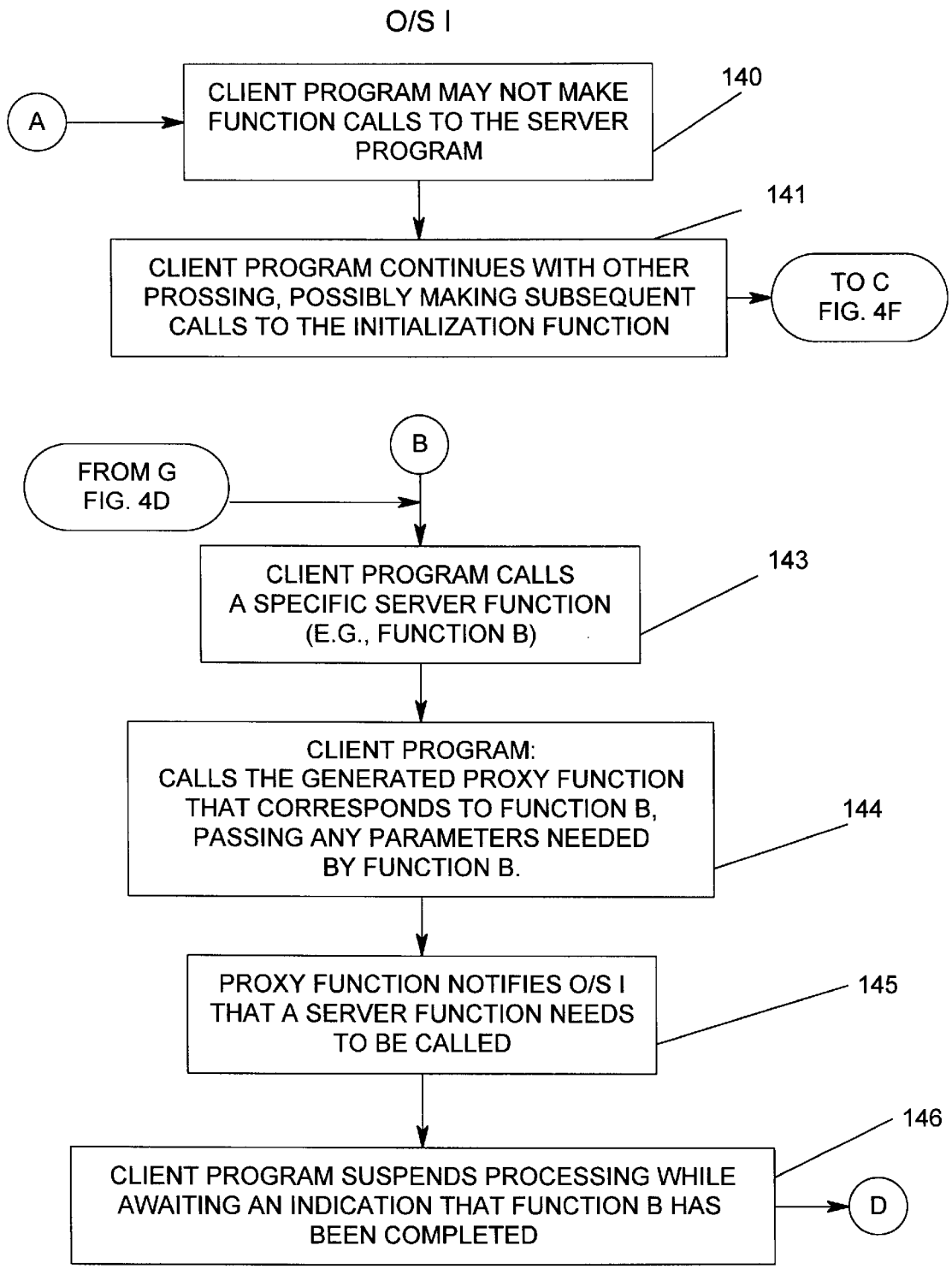

Referring now to FIG. 4B at the connector A, wherein all the illustrated steps are performed by the Client Program under control of the O/S I. Since the O/S II was unsuccessful in initiating the Server Program 106, the Client Program 111 may not make function calls thereto (block 140). The Client Program 111 may now continue with other processing, possibly making subsequent calls to the initialization function (block 131). Following this, a branch is taken to a point in the process shown in FIG. 4F and described further hereinafter.

Figure 7H:
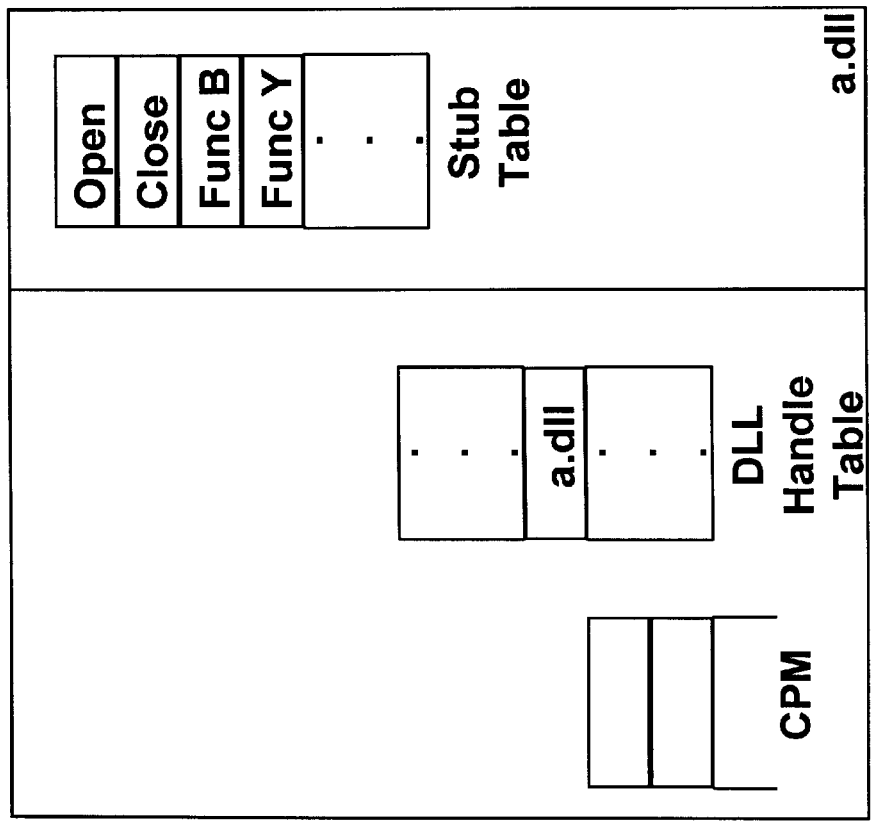
Figure 7H:
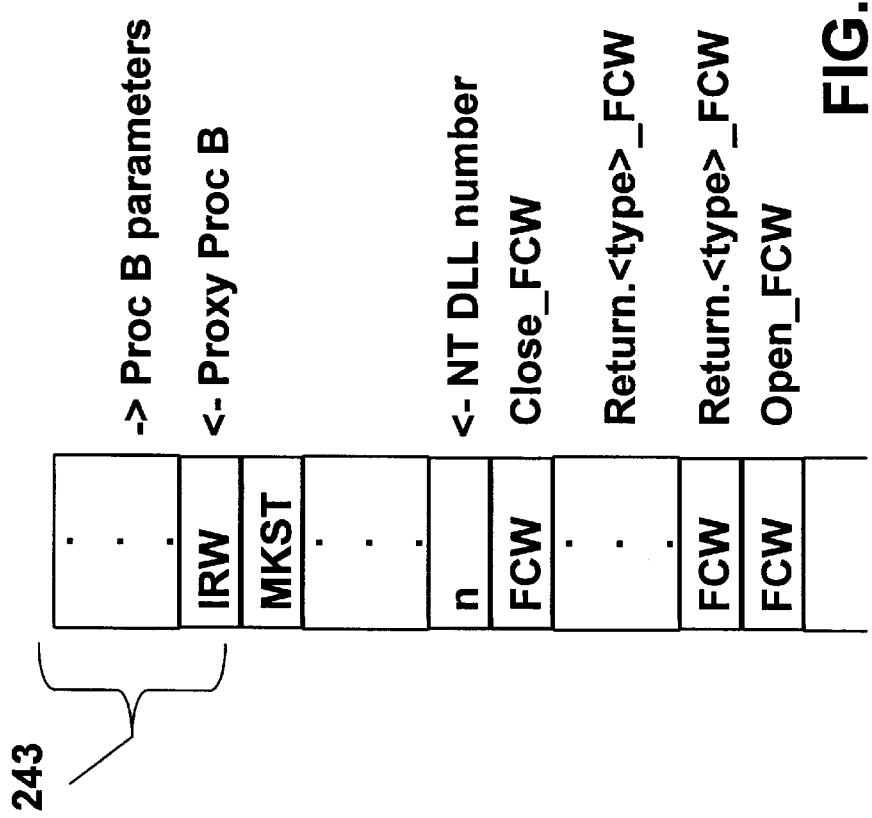
Figure 7J:
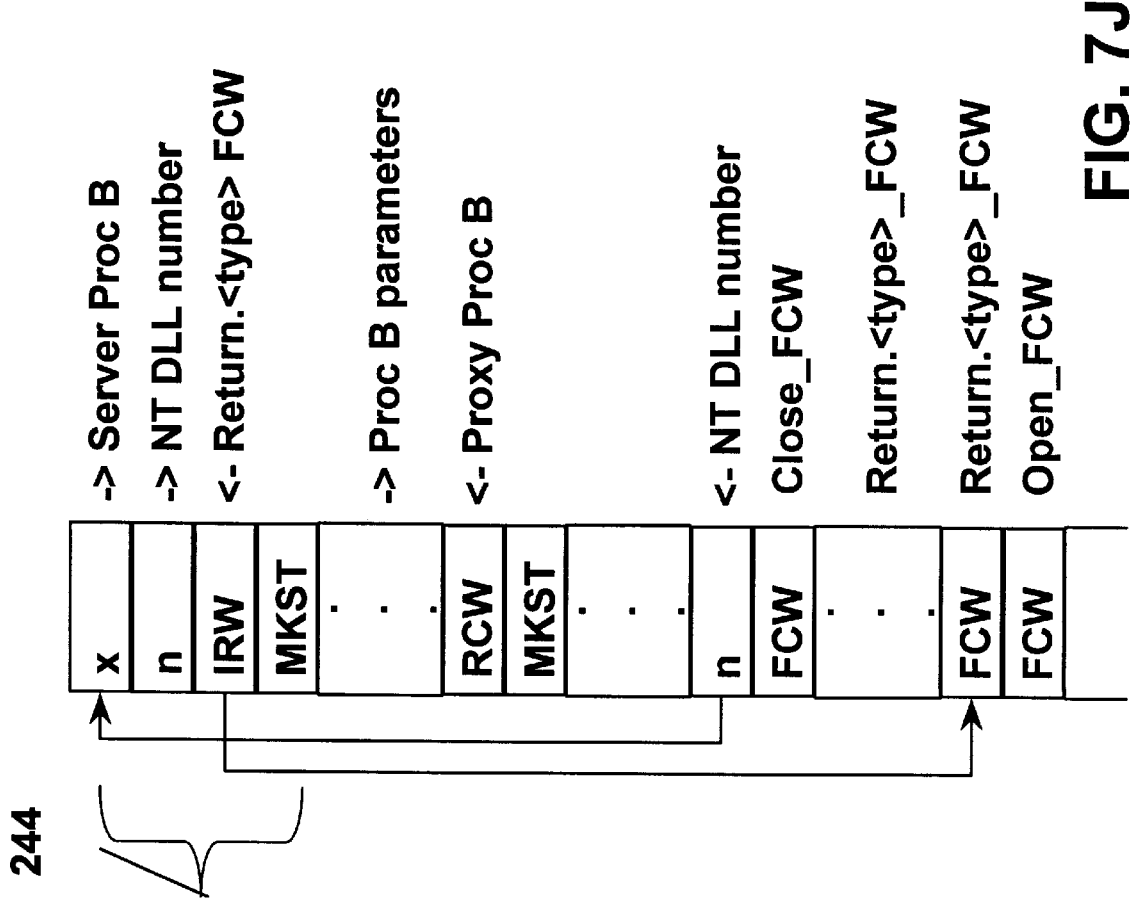
Figure 7K:
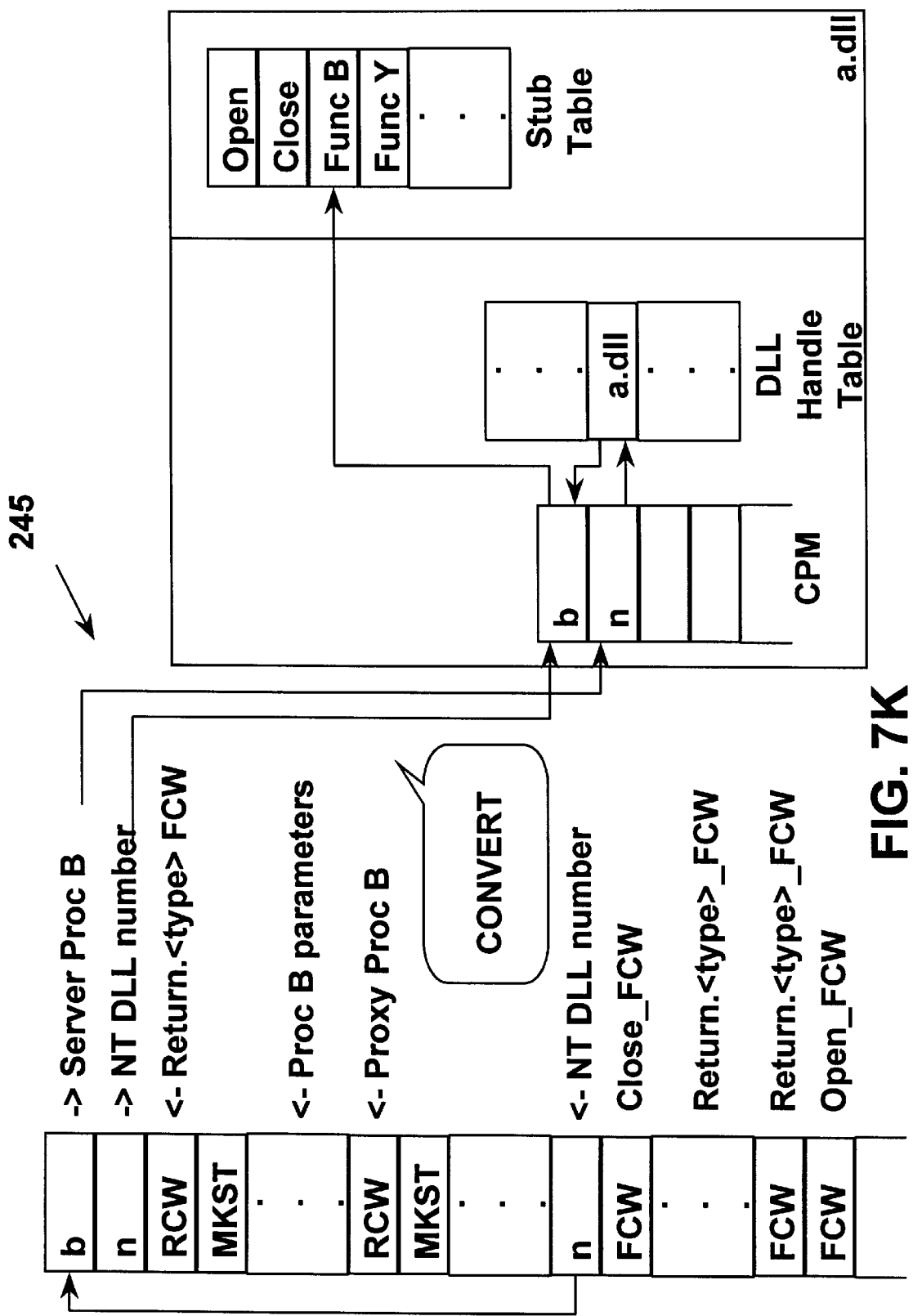

With reference to the connector B, which denotes a continuation of the process after the O/S II was successful in initiating the Server Program 106, the Client Program may now begin making function calls to the Server Program. At some later time, the Client Program 111 determines that it would like to call a specific server function, such as Function B (block 143). At that time, the Client Program calls the Generated Proxy Function that corresponds to Function B, and passes any parameters that may be needed by the Function B (block 144/244, FIG. 7H). This Proxy Function is a Generated Function that appears the same as the Function B to the Client Program, and which appears to perform all of the operations of the Function B. However, the Proxy Function does not directly perform any of these operations. Rather, the Proxy Function notifies the O/S II that a Server Function needs to be called (block 145/245, FIG. 7J and 7K). The Client Program 111 then suspends processing, awaiting an indication that the Server Function B has completed (block 146). Control is passed back to the O/S II as denoted by a connector D in FIG. 4B.

Figure 4C:
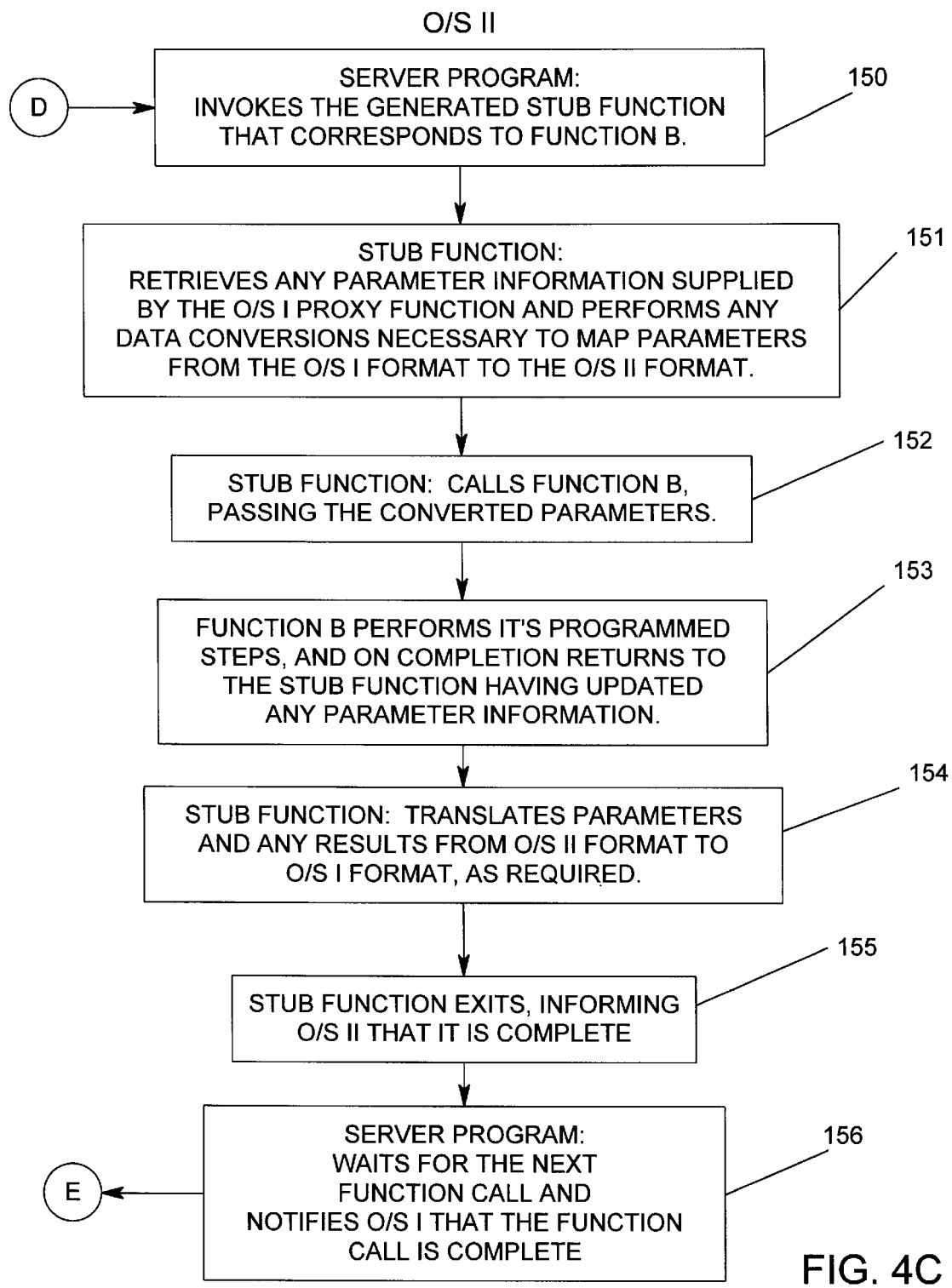
Figure 7L:
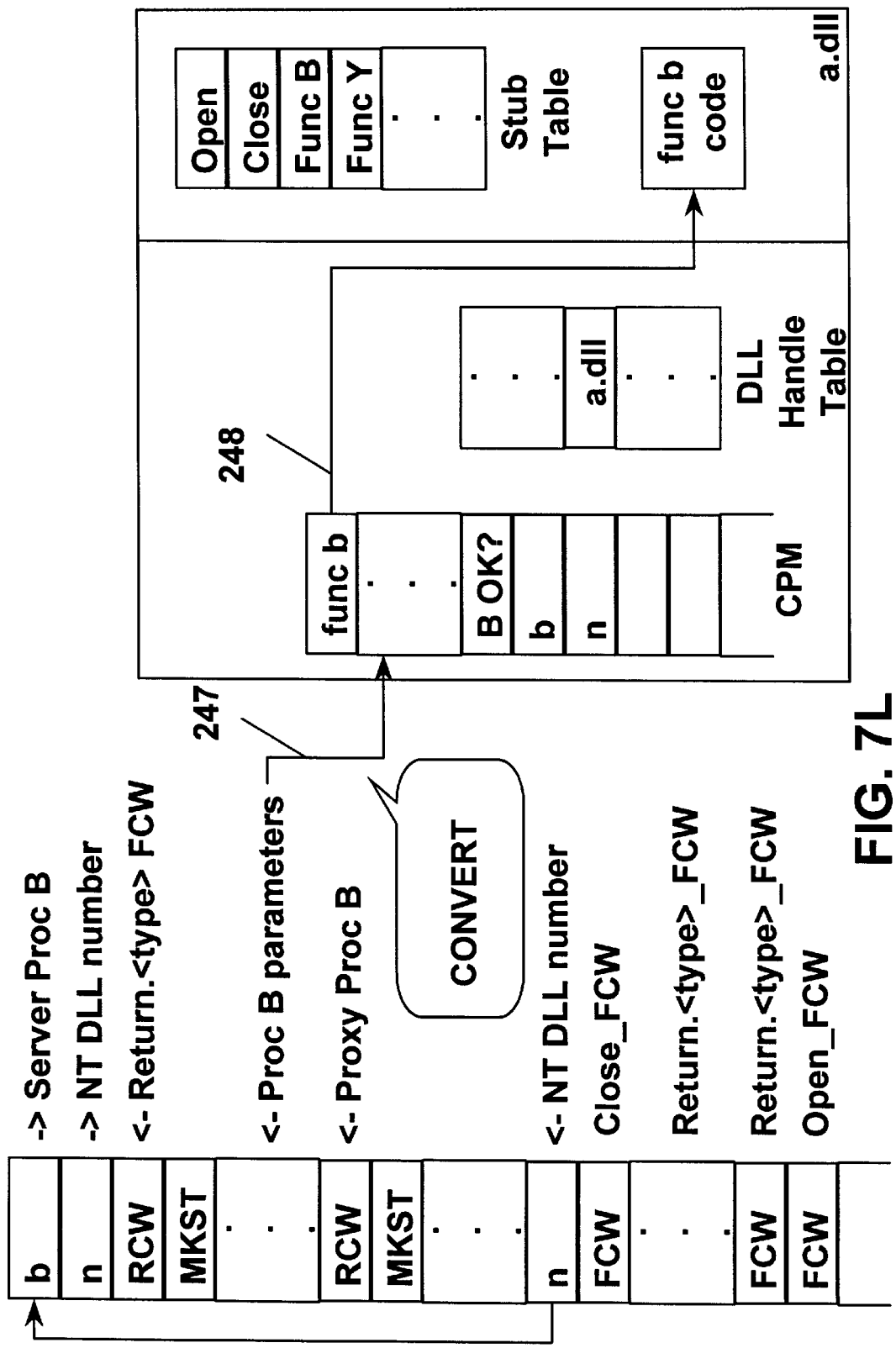
Figure 7M:
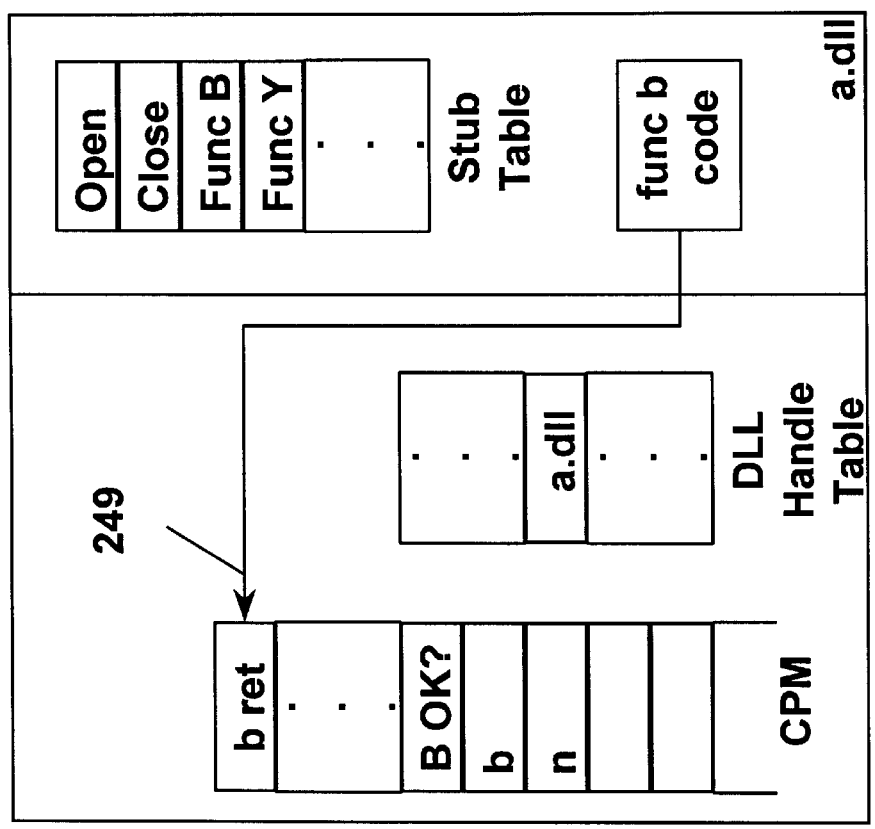
Figure 7M:
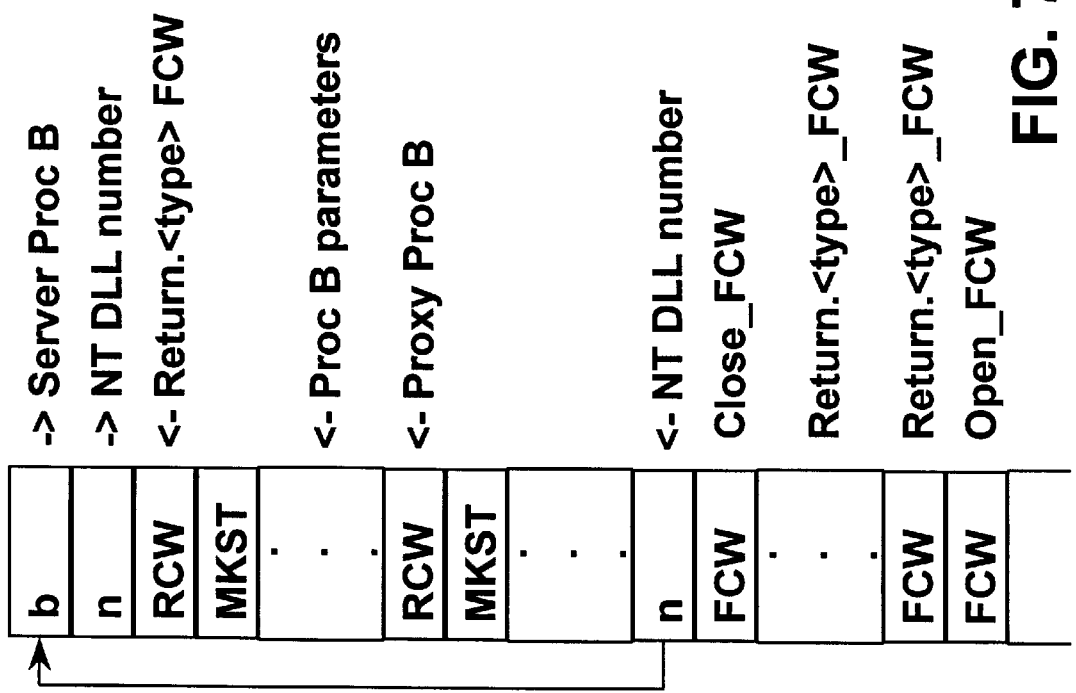

Referring now to FIG. 4C at the connector D, wherein all the illustrated steps are performed by the O/S II. The O/S II invokes the generated Stub Function in the Server Program 106 that corresponds to the Function B (block 150/250, FIG. 7K). This Stub Function is a Generated Function that is adapted to invoke the Function B. Next, the Stub Function retrieves any parameter information supplied by the Client Program Proxy Function, and performs any data conversions necessary to map the parameters from the O/S I format to the O/S II format (block 151/251, FIG. 7L). The Stub Function then calls the Function B and passes the converted parameters (block 152/252, FIG. 7L). The Function B performs whatever steps it was programmed to perform. When finished, the Function B returns to the Stub Function passing a result value (if appropriate), and after having updated any parameter information (block 153/253, FIG. 7M).

Figure 7N:
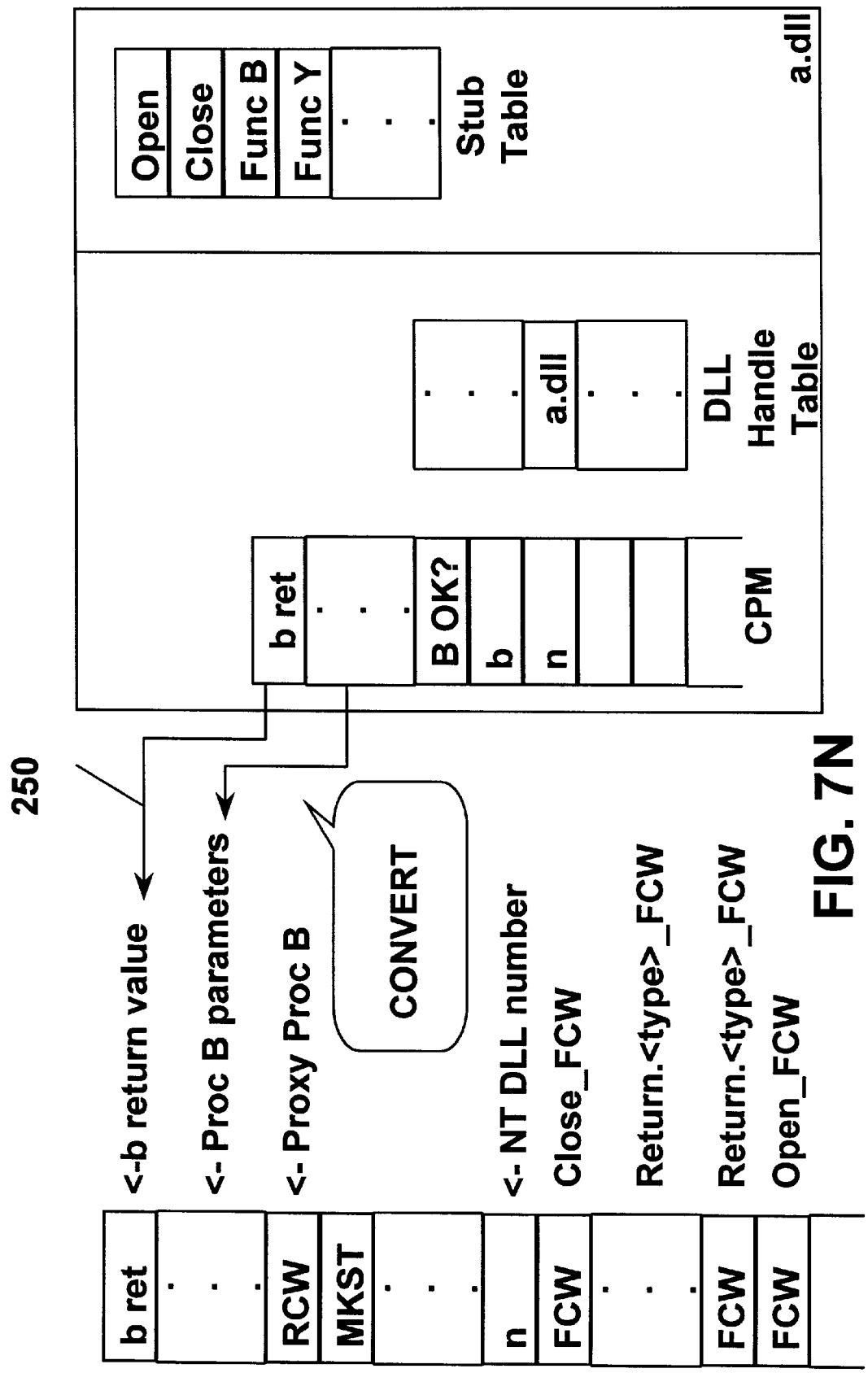
Figure 7P:
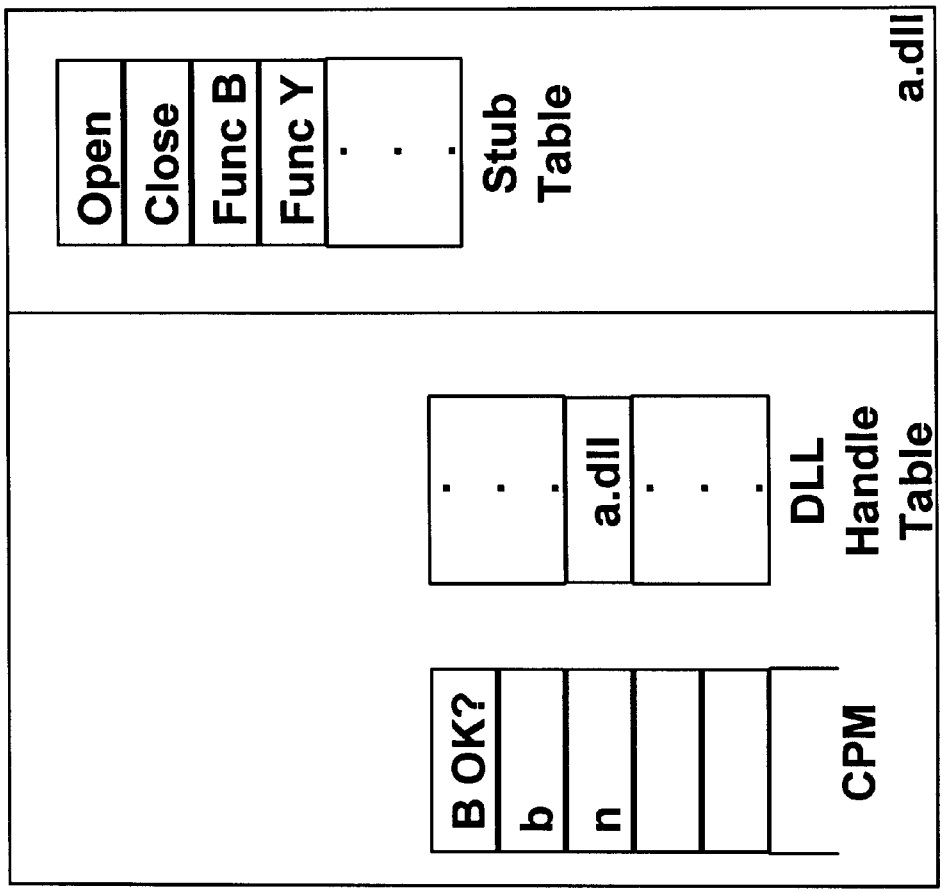
Figure 7P:
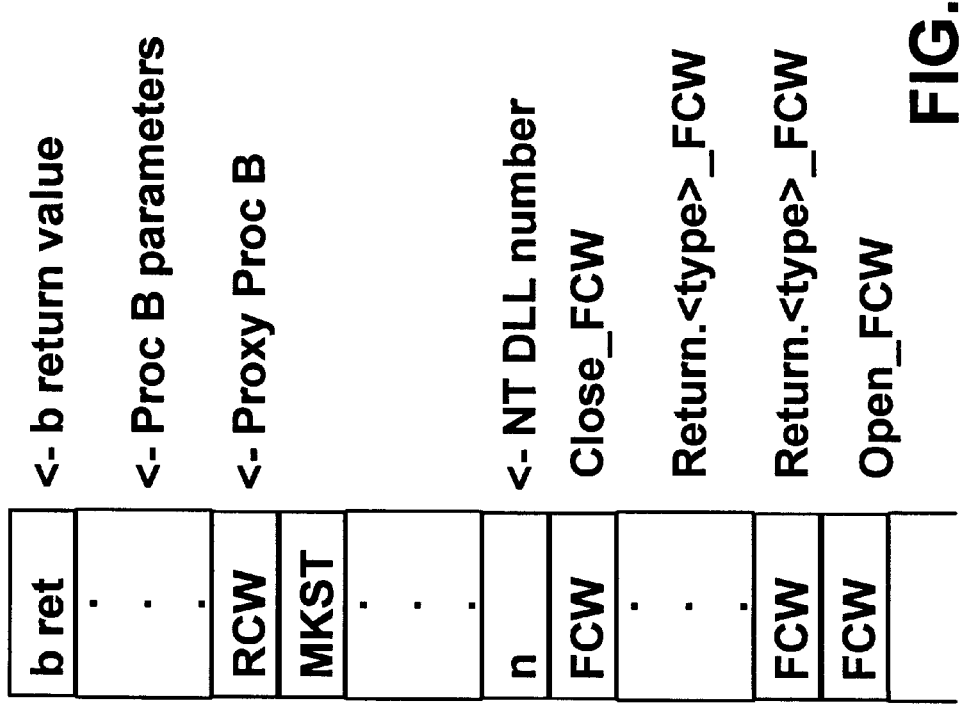

The Stub Function then translates the parameters from the O/S II compatible format, to the O/S I compatible format (as needed), and also translates any return value from the O/S II compatible format, to the O/S I compatible format (block 154/254, FIG. 7N). The translated values are made available to the Client Program Proxy Function. The Stub Function then exits, informing the O/S II that it is complete (block 155/255, FIGS. 7P and 7Q). The Server Program 106 then waits for the next function call, and the O/S II notifies the O/S I that the function call is complete (block 156/256, FIG. 7Q). A transfer of control is made back to the O/S I as denoted by a connector E in FIG. 4C.

Figure 4D:
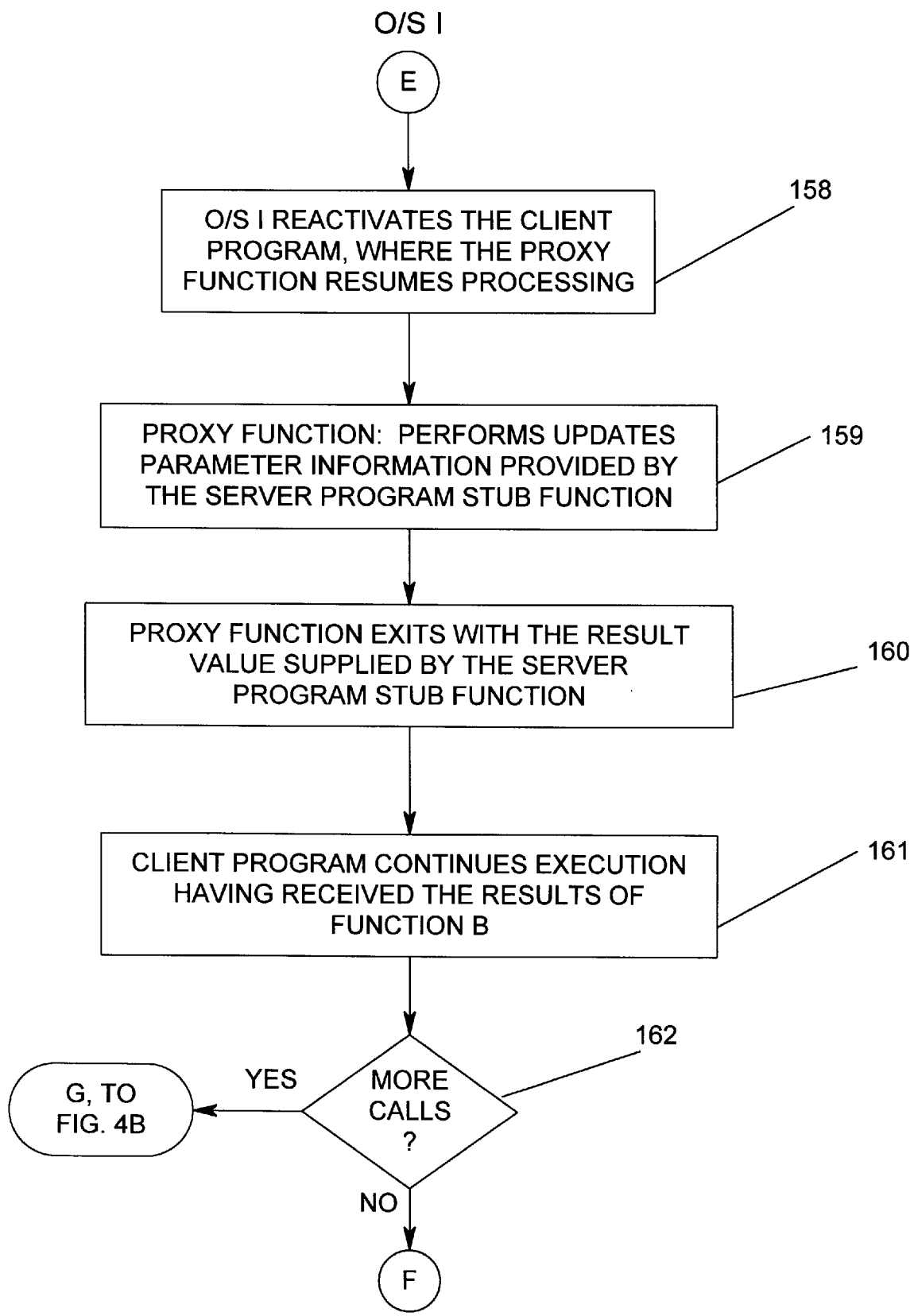
Figure 7Q:
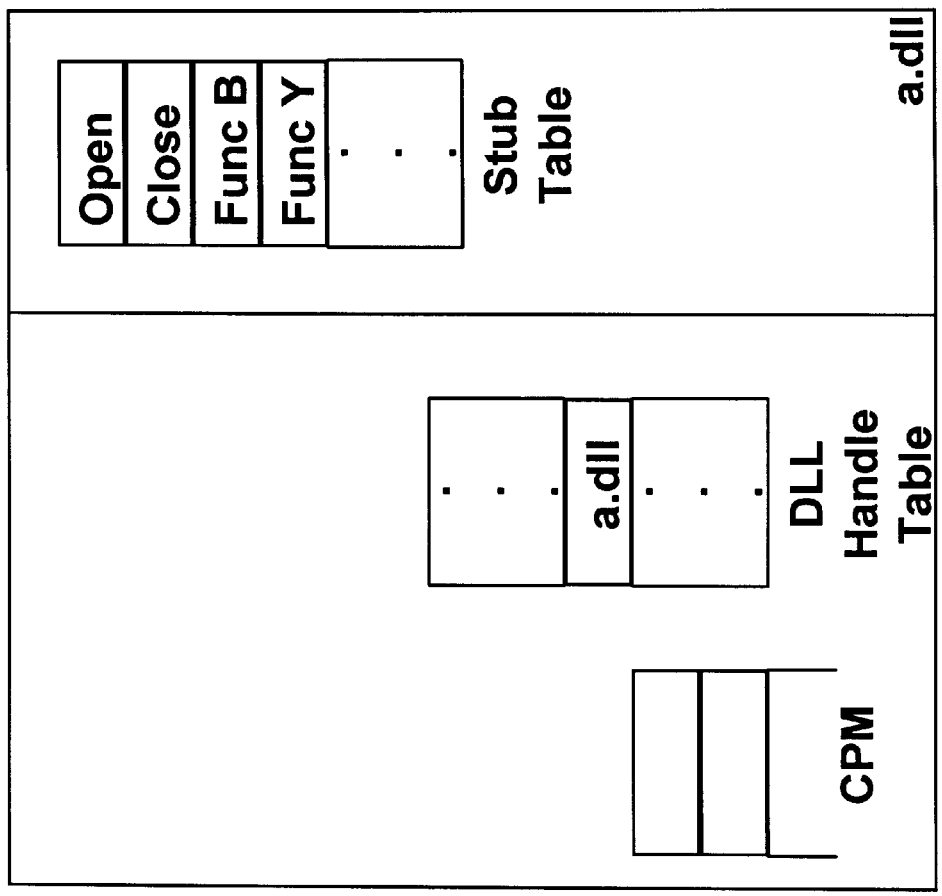
Figure 7Q:
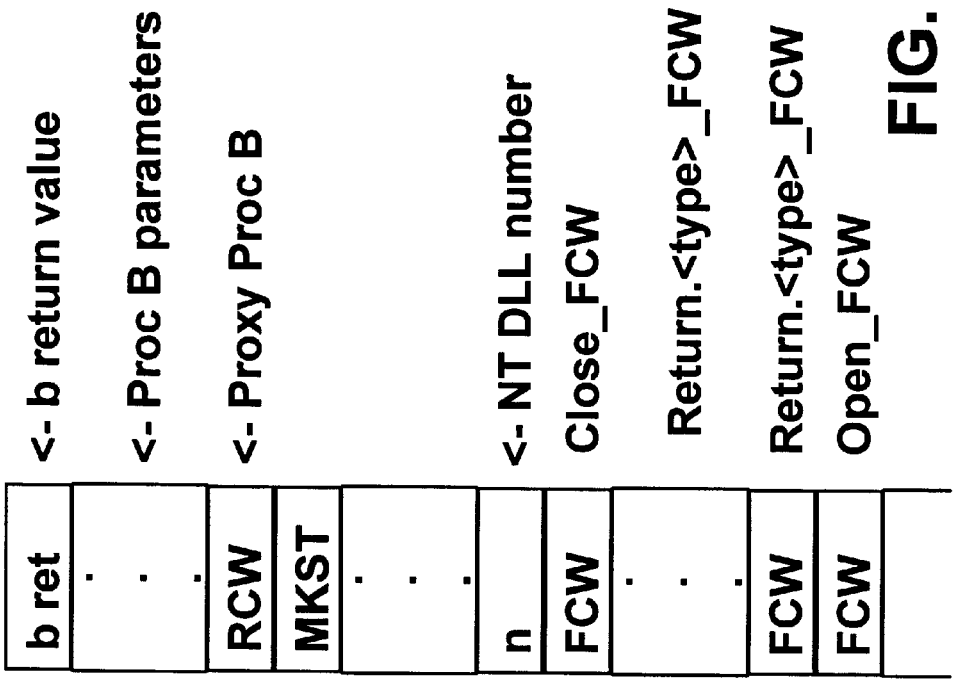
Figure 7R:
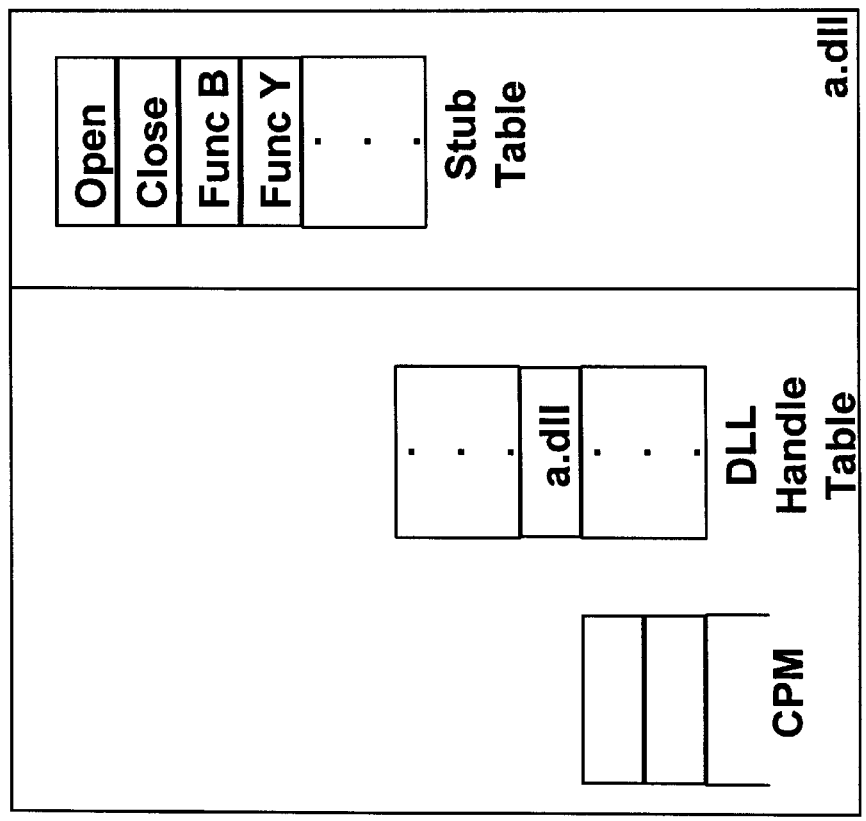
Figure 7R:
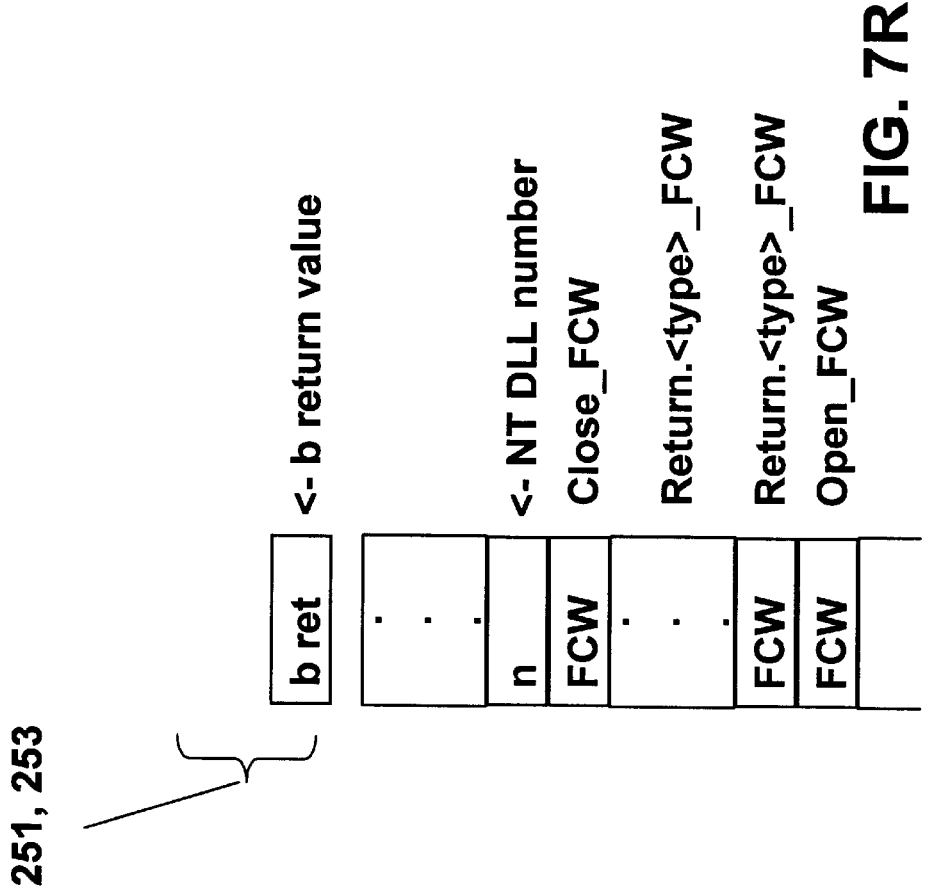

Referring now to FIG. 4D at the connector E, wherein all the illustrated steps are performed by the O/S I, which reactivates the Client Program 111 and the Proxy Function resumes execution (block 158/258, FIG. 7Q). The Proxy Function performs any steps necessary to update parameter information provided by the Server Program Stub Function (block 159/259, FIG. 7R). Next, the Proxy Function exits with the result value (if any) supplied by the Server Program Stub Function (block 160/260, FIG. 7R). The Client Program then continues normal execution, having received the results of Function B (block 161/261 FIG. 7R). The process described thus far can be repeated as often as necessary, with the Client Program 111 making additional calls to various functions in the Server Program, as necessary. Accordingly, at some later time, an inquiry is made as to whether or not there are more calls (diamond 162). If the answer to this inquiry is yes, then a branch is taken back to the block 143 (FIG. 4B) as denoted by a connector G in FIG. 4D. On the other hand, if there are no more calls then the process continues on the next sheet of the drawings as denoted by a connector F in FIG. 4D.

Figure 4E:
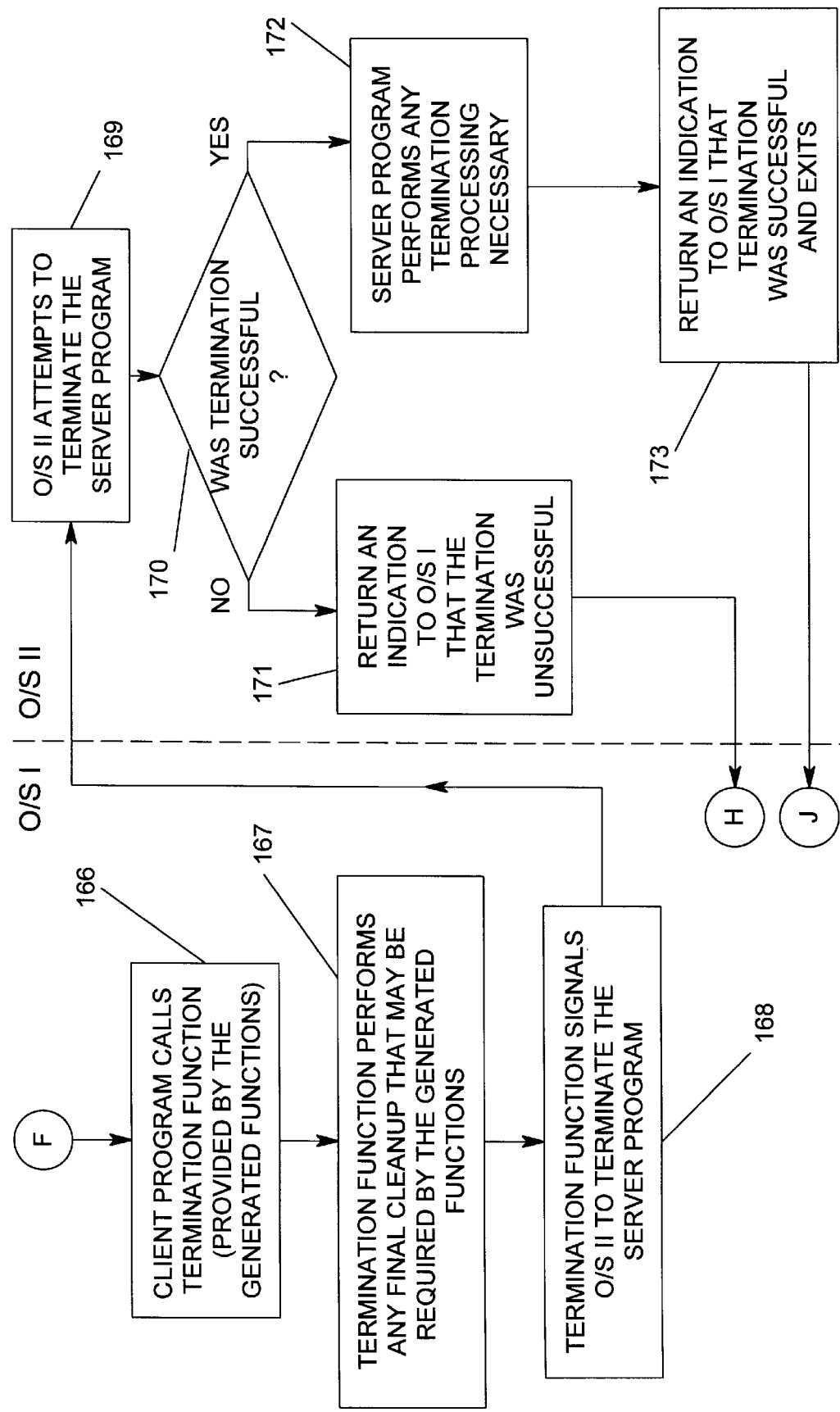
Figure 7S:
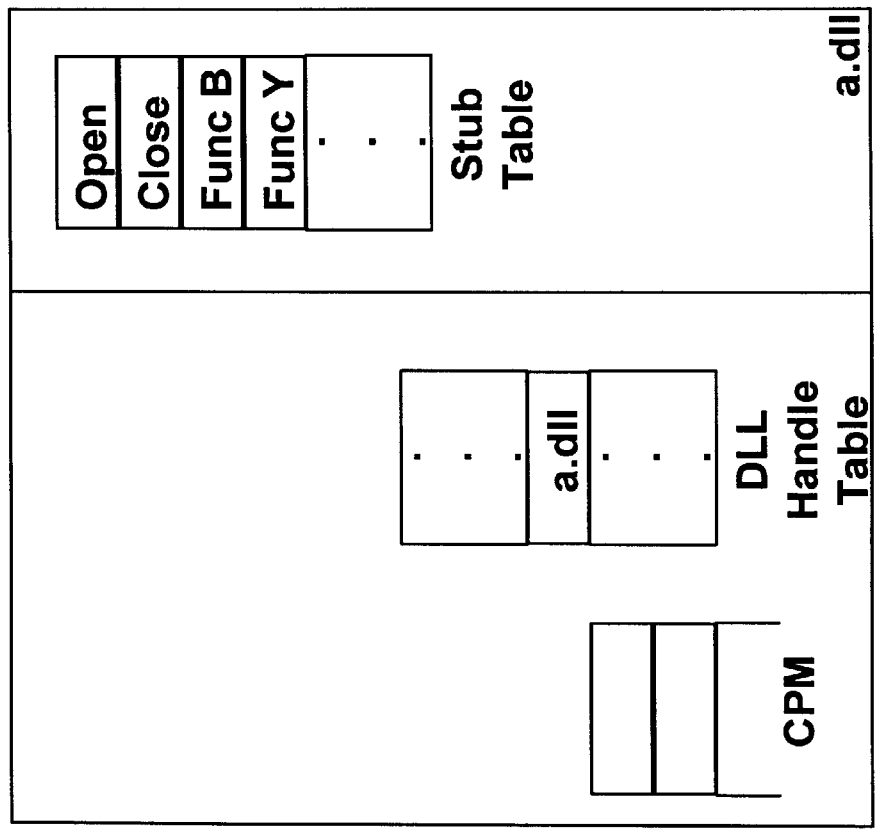
Figure 7S:
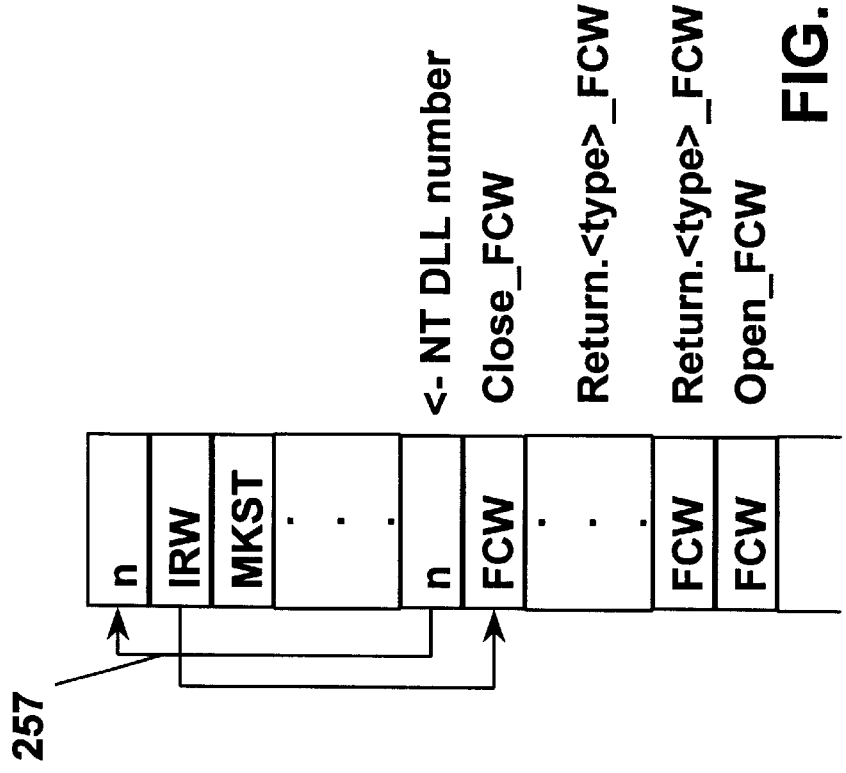
Figure 7T:
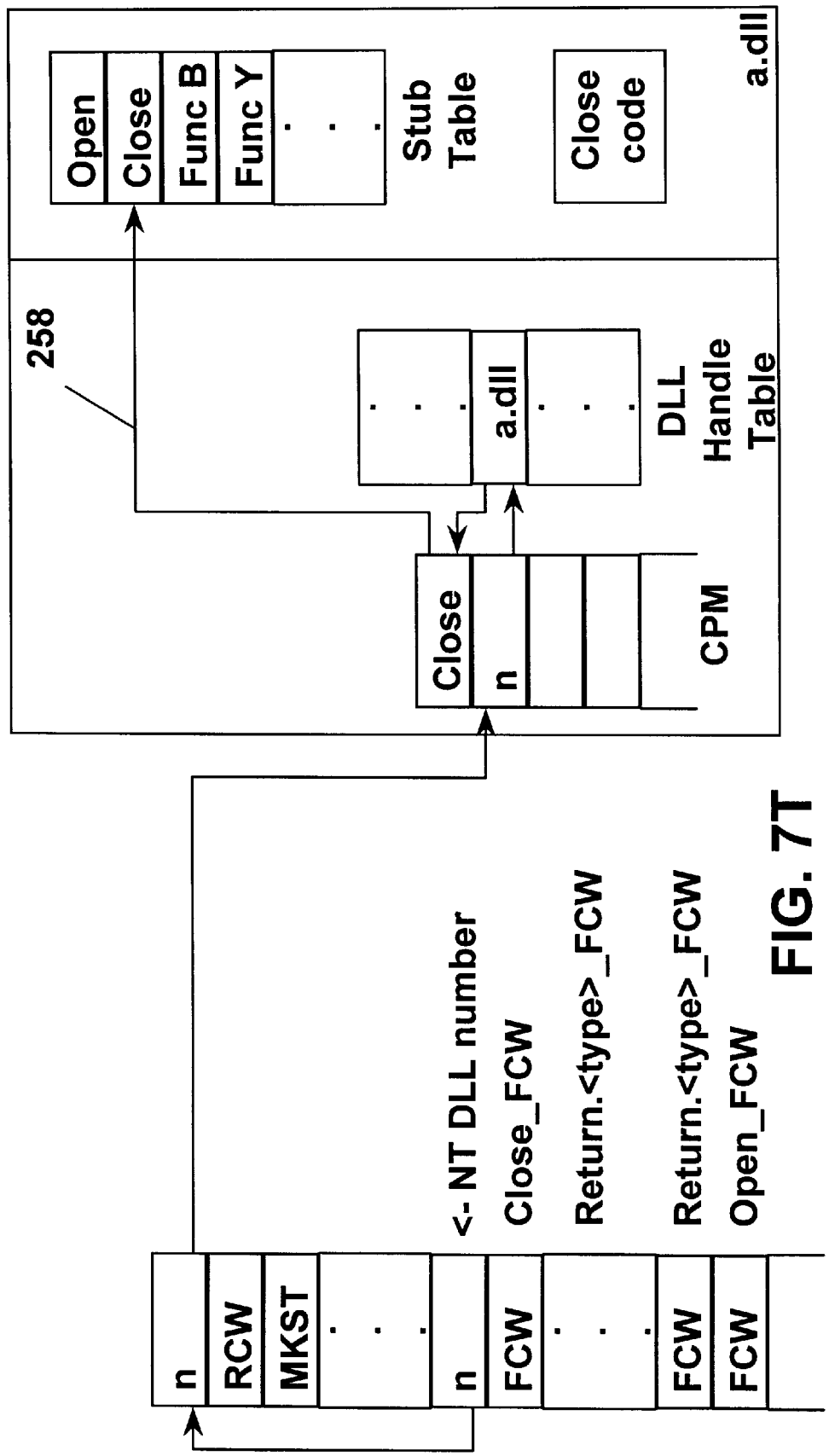
Figure 7U:
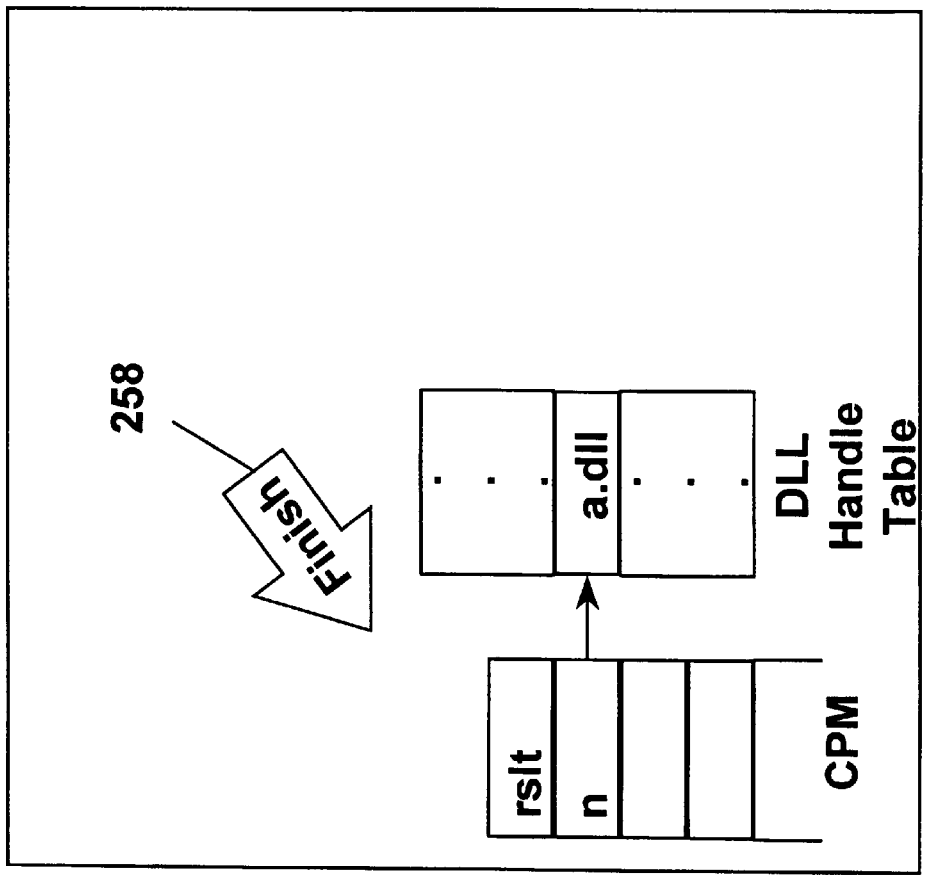
Figure 7U:
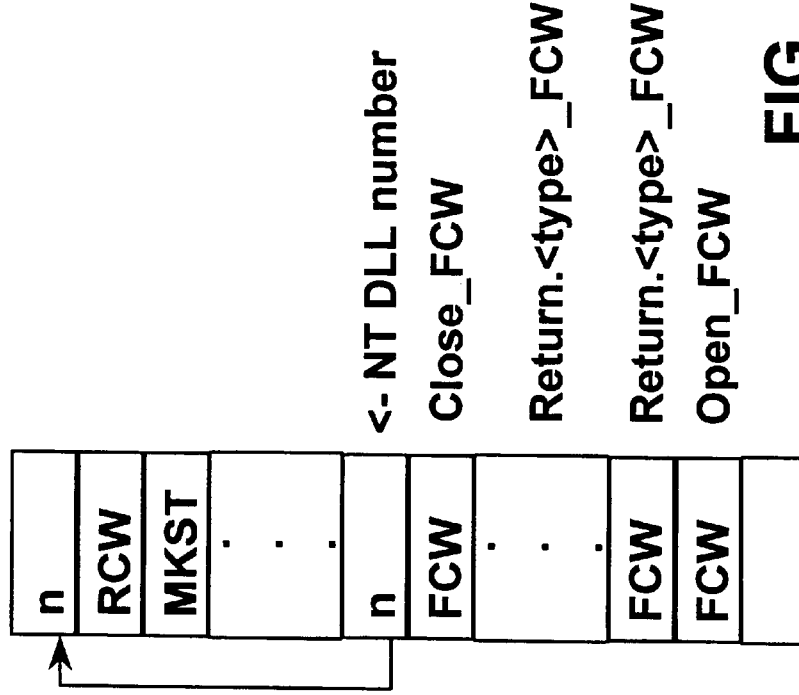
Figure 7V:
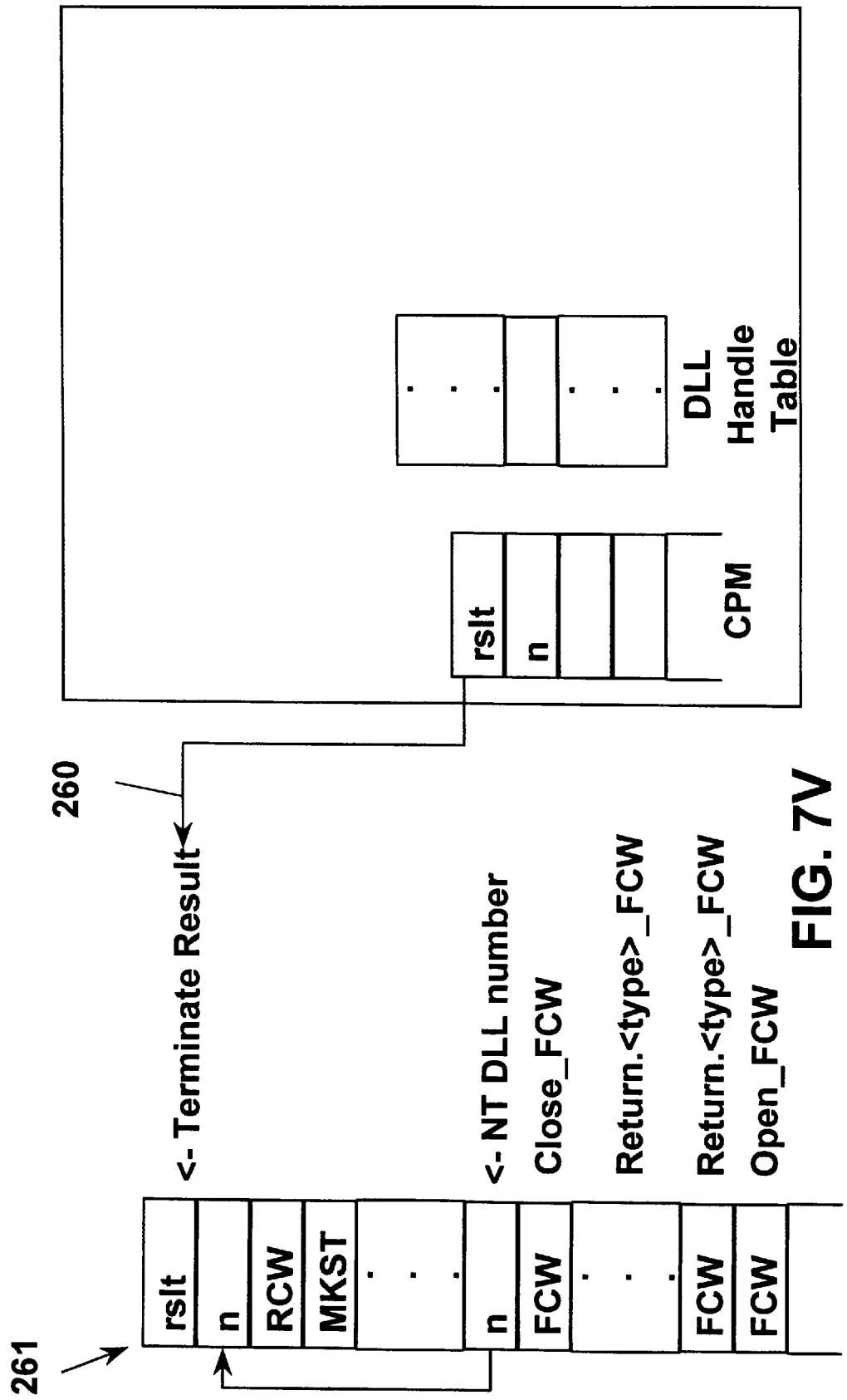
Figure 7W:
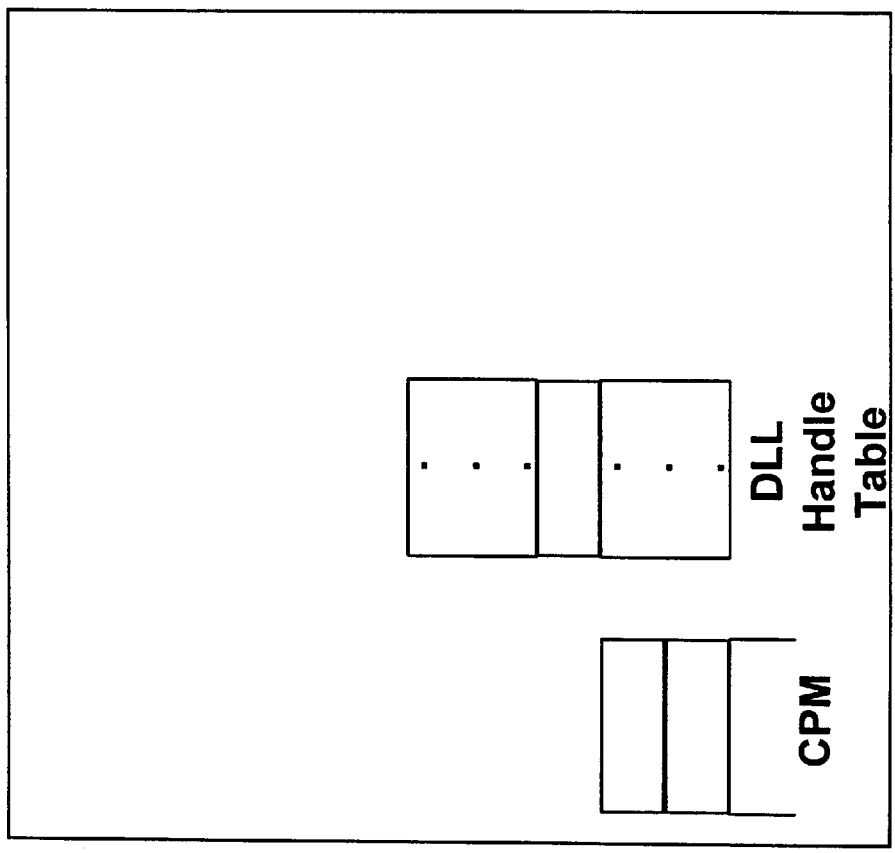
Figure 7W:
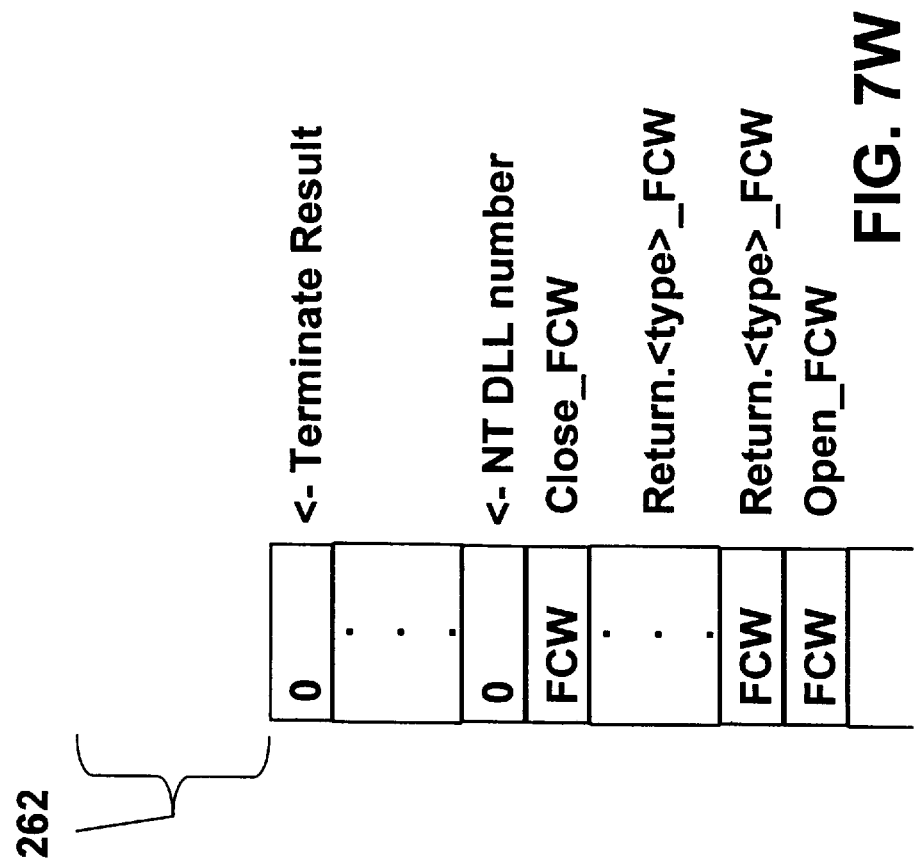

Referring now to FIG. 4E at the connector F, under control of the O/S I the Client Program 111 calls a termination function that was provided in the Generated Functions (block 166/266, FIG. 7S). This termination function performs any final cleanup that may be required by other Generated Functions (block 167/267 FIG. 7S). The termination function then signals the O/S II to terminate the Server Program (block 168/268, FIG. 7S). The O/S II attempts to terminate the Server Program (block 169/269, FIG. 7U). An inquiry is next made as to whether or not the termination was successful (diamond 170/270, FIG. 7U). If the termination was not successful, an indication is returned to the Client Program to this affect (block 171/271, FIG. 7V) as denoted by a connector H in FIG. 4E. On the other hand, if the termination was successful, the Server Program performs any termination processing necessary (block 172). An indication is then returned to the Client Program that the termination was successful (see FIG. 7V), as denoted by a connector J in FIG. 4E, and then the Server Program exits (block 173/273, FIG. 7W).

Figure 4F:
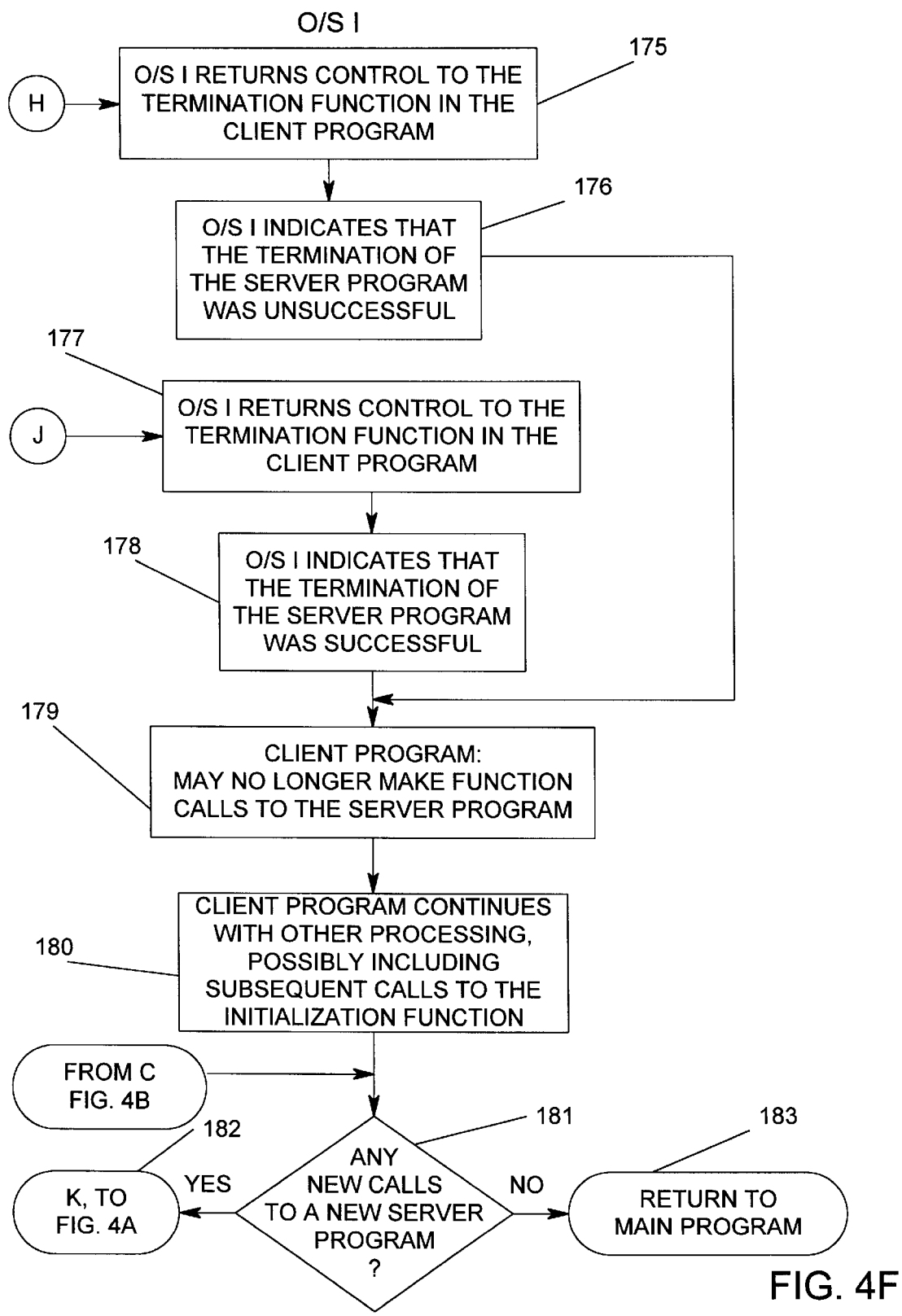

Referring now to FIG. 4F at the connector H, wherein all the illustrated steps are performed by the O/S I. Control is returned to the Termination Function in the Client Program (block 175/275, FIG. 7W). Next, an indication is received that termination of the Server Program was unsuccessful (block 176/276, FIG. 7W). Following this, a branch is taken to a later step in the process, which will be described hereinafter.

With reference to the connector J, in a similar manner control is returned to the Termination Function in the Client Program 111 (block 177). Next, an indication is received that termination of the Server Program was successful (block 178). At this juncture, the branch from the step depicted by the block 176 is joined. The Client Program 111 may no longer make function calls to the Server Program 106 (block 179). Subsequently, the Client Program continues with other processing (block 180). Following this, an inquiry is made as to whether or not there are any calls to be made to a new Server Program (diamond 181). If the answer to this inquiry is yes, then a return is made back to the step depicted by the block 131 shown in FIG. 4A as denote by a connector K (bubble 182). On the other hand, if the answer to this inquiry is no, then a return is made back to the main program that made the external procedure call as denoted by a bubble 183.

At this juncture of the description it is noted that the designations of Client Program in the O/S I, or Server Program in the O/S II is determined by which program makes a call to an initialization generated function. The program that makes such a call is designated the Client Program, and the other program is designated the Server Program. The designation is transient, and only applicable during the duration of each step of the above-described process. Either program may be both a Client Program and a Server Program, at different times, as determined by the functions declared in the Interface Definition Language. In this way, it is possible for a program in the O/S I to call functions resident in a program in the O/S II, and for the same program in the O/S II to call functions resident in the program in the O/S I. That is, the programs may alternate the roles of Client Program and Server Program.

Further, these role reversals may be interleaved. That is, a program acting as a Server Program may begin acting as a Client Program, while still in the role of a Server Program. This process is known as Callbacks in External Procedure Calls, and occurs when a called server function (while processing) calls a function resident in the original program that called the server function. Further, these Callback functions may be nested. That is, a program acting as a Client Program and then acting as a Server Program during the scope of the Client Program call, may then act again as a Client Program during the scope of the server function execution. In this way, function calls may proceed back and forth between the programs, each building on the other, to an arbitrary depth. When calls are made in this fashion, most recently invoked functions are always completed and exited prior to any earlier invoked functions being completed. That is, functions are completed in a last-invoked, first-completed fashion.

Figure 5:
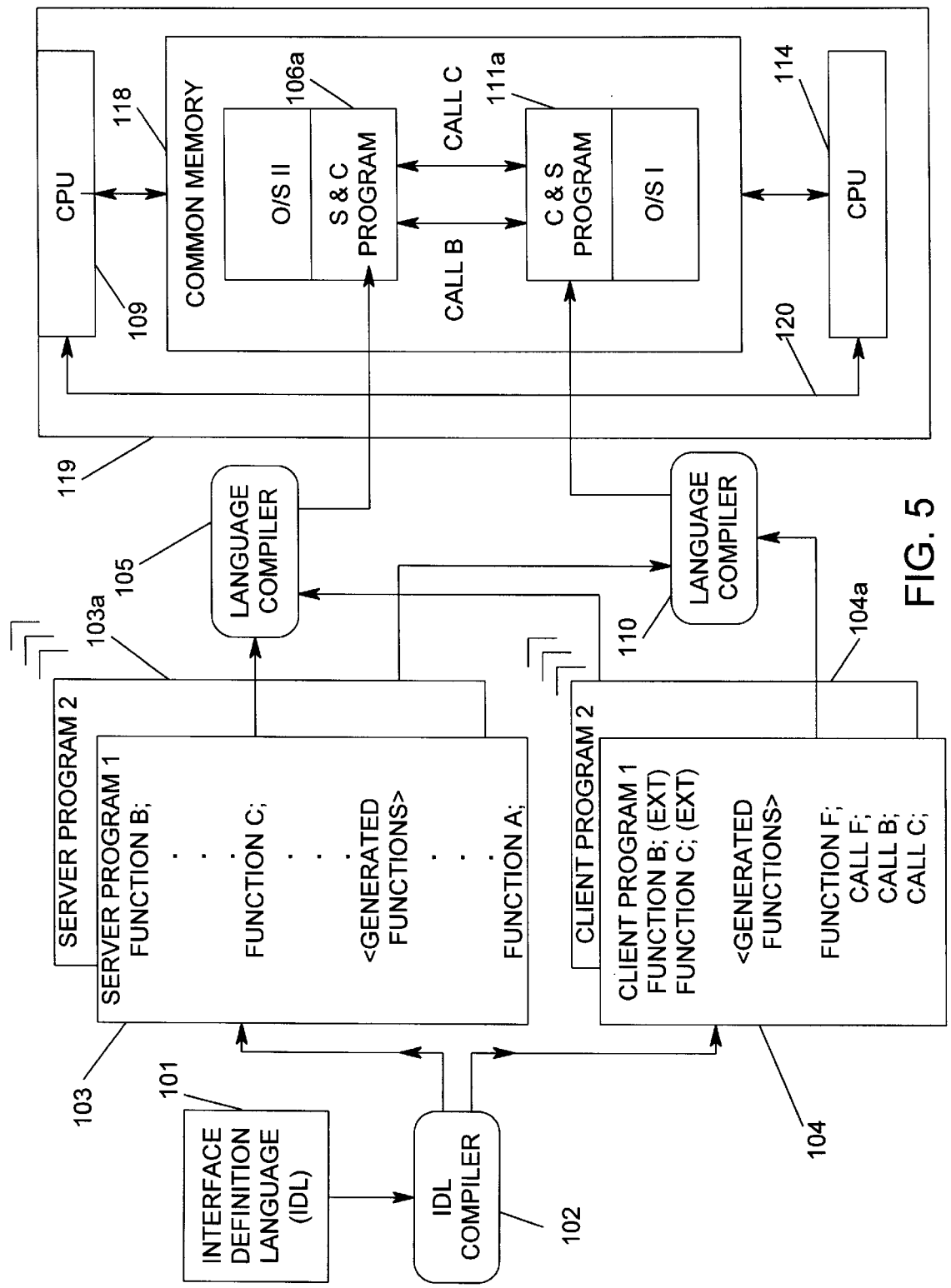
FIG. 5 is a block diagram showing a multiplicity of Server Programs that may be operating under the control of more than one other operating system and running on one or more additional CPUs, and accessible by one or more client programs, all within the same heterogeneous multiprocessing system.

To further illustrate the above, reference is made to FIG. 5, wherein the software modules that are illustrated in FIG. 2 and described earlier have been enhanced to include multiple Server Programs 103a et seq; and, multiple Client Programs 104a et seq. As was pointed out above, the modules shown in this diagram show the program during development time. In the illustrated embodiment, the Server Program 1 (103) and the Client Program 2 (104a) are combined by the Server Language Compiler 105 to include functionality of both programs, which are identified herein as S & C Program 106a. In a similar manner, the Client Program 1 (104) and the Server Program 2 (103a) are combined by the Server Language Compiler 110 to include functionality of both programs, which are identified herein as C & S Program 111a.

Although the system and process described hereinabove depicts exactly two programs (one Client Program, and one Server Program), there is no restriction that the roles of Client Program and Server Program always be taken by the same physical programs. That is, a Server Program may initiate a callback function to another program that is not the same program, but is acting as a Client Program. Likewise, a Client Program may initiate function calls to more than one Server Program, and the Client Program may in turn act as a Server Program with respect to any or all of these Server Programs. There is no limit on the number of different physical programs that may be involved in the above-described calling sequences.

Figure 6:
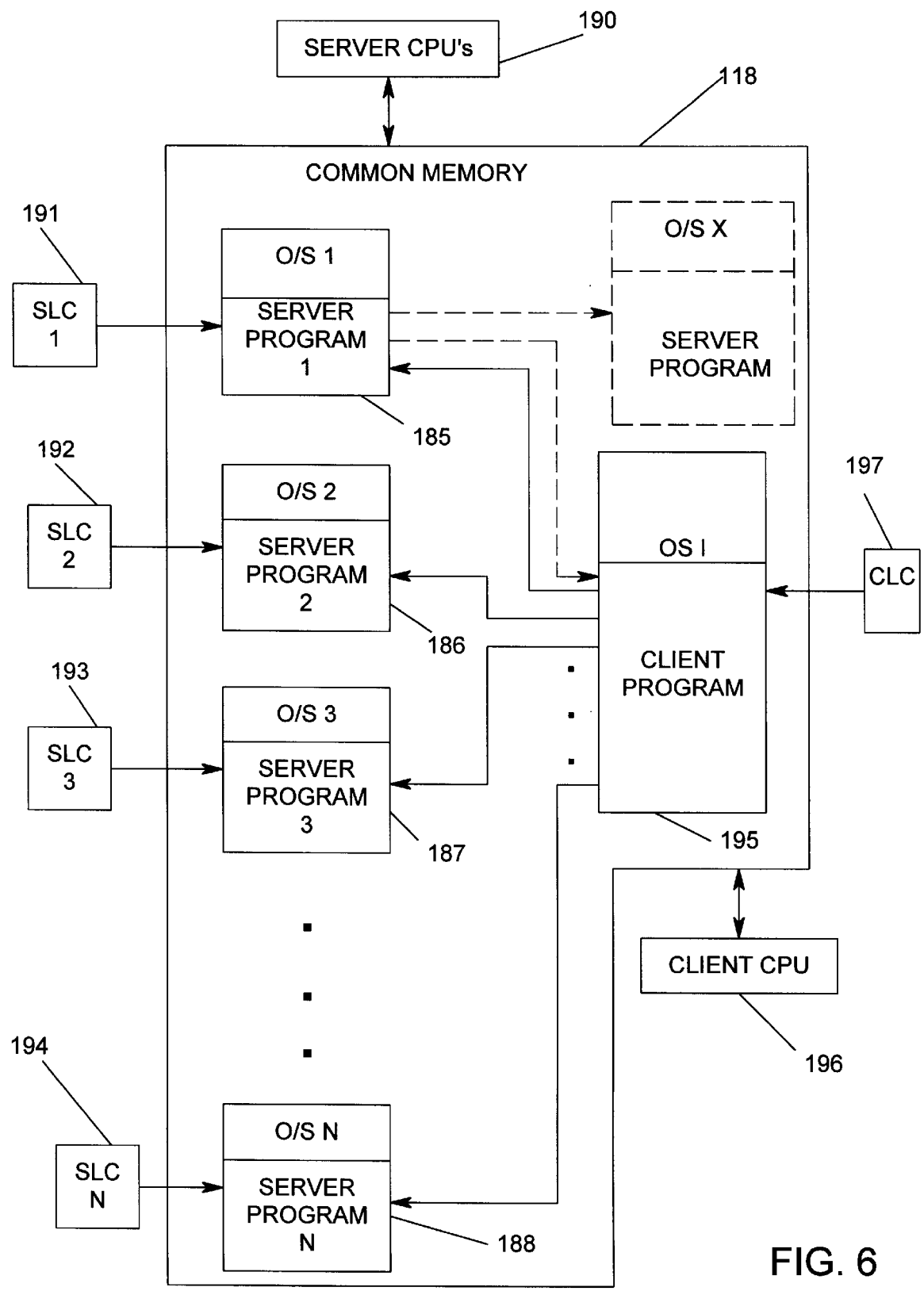
FIG. 6 is an illustration of a multiple program system employing the principles of the present invention.

An example of a multiple program system is illustrated in FIG. 6 and amplified hereinbelow. A plurality of Server Programs 185 through 188 are all stored in the same common memory 118. One or more CPU's, which are collectively referred to as CPU's 190, execute the Server Programs and are controlled by Operating Systems O/S 1 through O/S N, respectively. The Server Programs 185 through 188 are also stored in the common memory 118, and are compiled by Server Language Compilers (SLC's) 191 through 194, respectively, and are the same as those described hereinabove. A Client Program 195 is also stored in the common memory and is controlled by Operating System I, which also controls the CPU 196 that executes the Client Program 195. The Client Program is compiled by a Client Language Compiler 197 in the same manner as that described hereinabove.

The Client Program 195 is able to make calls to any of the Server Programs 185 through 188, and may make separate calls to more than one Server Program each of which would then operate in parallel. With reference to FIGS. 4A through 4F, the External Procedure Program of the present invention could make calls at various steps during the process. For example, calls could be made after the following steps: the start bubble 130, indication return step 139, steps 140 and 161, the yes path from the diamond 162, the steps 175, 177, 179, 183 and the yes path of the diamond 181, which is also back to the start bubble 130.

In addition to the above, the Server Program 185 could call another Server Program 200 (illustrated in phantom lines) in the same manner as the Client Program calls a Server Program using the method of the present invention.

Although not depicted in FIG. 6, so as to avoid confusion, it should be noted that more than one Server Program can exist under control of a single operating system, more than one Client Program can exist under control of a single operating system, each operating system can control more than CPU in Simultaneous Multiprocessing mode, and the roles of Client Program and Server Program may be taken on by any of the external procedure call programs as previously described.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

What is claimed is:

1. In a heterogeneous computer system having at least two CPUs and a common memory completely accessible by at least one each of said CPUs and disposed for storing at least two different operating systems that actively run simultaneously and concurrently control resources of said heterogeneous computer system, a method for performing function calls from a first program operating under control of a first of said operating systems, and running on a first of said CPUs, to a second program operating under control of a second one of said operating systems, and running on a second one of said at least two CPUs, said method comprising the steps of:

a. said first program calling an initialization function and sending initialization signals to said second operating system via a CPU-to-CPU signal bus between said at least two CPUs to initiate said second program;

b. after successfully initiating said second program, said first program making calls to said second program to perform a specific function via said CPU-to-CPU signal bus;

c. said first program converting parameters from a format compatible with said first operating system to a format compatible with said second operating system;

d. said first program storing parameters in a first program stack having a portion thereof stored in said common memory;

e. said second program fetching said parameters directly from said first program stack;

f. said second program processing said parameters according to said specific function;

g. said second program converting results of the preceding step from a format compatible with said second operating system to a format compatible with said first operating system;

h. said second program storing said results converted in the previous step in a second program stack having a portion thereof within said common memory;

i. said second program reactivating said first program via said CPU-to-CPU signal bus; and, j. said first program fetching from said second program stack said results converted in step f hereof.

2. A method as in claim 1 further including the step of said second program converting data from a format compatible with said first program to a format compatible with said second program.

3. A method as in claim 1 further including the step of said first program converting said parameters from a format compatible with said first program to a format compatible with said second program.

4. A method as in claim 1 wherein in response to said step of sending initialization signals, further including the step of said second operating system attempting to initiate said second program.

5. A method as in claim 4 wherein said step of attempting to initiate is unsuccessful, returning an indication to said first program of the unsuccessful attempt.

6. A method as in claim 4 wherein said first program continues with processing without accessing said second program.

7. A method as in claim 1 wherein said first program suspending operation while awaiting an indication that processing of said parameters is complete.

8. A method as in claim 1 wherein said step of said second program processing said parameters further including any processing necessary to perform said function.

9. A method as in claim 1 further including the step of repeating steps b through i for each occurrence that said first program makes calls to said second program to perform a specific function.

10. A method as in claim 1 further including the step of said first program signaling said second operating system to terminate operation of said second program.

11. A method as in claim 10 further including the steps of:
a. said first program calling a termination function; and,
b. said termination function signaling said second operating system to terminate said second program.

12. A method as in claim 11 further including the steps of:
a. said second operating system attempting to terminate said second program in response to said termination function signaling said second operating system,; and,
b. if termination is successful, said second program performing any termination processing necessary; and,
c. said second program returning an indication to said second operating system that termination was successful and exiting operation.

13. A method as in claim 12 wherein said termination is not successful, further including the step of returning an indication to said first operating system that termination was not successful.

14. A method as in claim 12 further including the step of said first operating system returning control to said termination function in said first program.

15. A method as in claim 12 further including the step of said second operating system indicating that termination of said second program was successful, whereby said first program is no longer able to make function calls to said second program.

16. A method as in claim 13 further including the step of said first program continuing with other processing which may include making subsequent calls to said second program.

17. A method as in claim 1 where in step c thereof said second program converts said parameters from a format compatible with said first operating system to a format compatible with said second operating system.

18. A method as in claim 1 where in step g thereof said first program converting results of step f from a format compatible with said second operating system to a format compatible with said first operating system.

19. In a heterogeneous computer system having at least two CPUs and a common memory completely accessible by at least one of said CPUs and disposed for storing at least two different operating systems that actively run and control resources of said heterogeneous computer system, a method for performing function calls from a first program operating under control of a first of said operating systems, and running on a first of said CPUs, to a second program operating under control of a second one of said operating systems, and running on a second one of said at least two CPUs, said method comprising the steps of:
a. said first program calling an initialization function and sending initialization signals to said second operating system via a CPU-to-CPU signal bus between said at least two CPUs to initiate said second program;
b. said first program making calls to said second program to perform a specific function after successfully initiating said second program via said CPU-to-CPU signal bus;
c. said first program converting parameters from a format compatible with said first operating system to a format compatible with said second operating system;
d. said first program storing parameters in a first program stack having a portion thereof within said common memory;
e. said second program fetching said parameters directly from said first program stack for processing according to said function;
f. said second program converting results of the preceding step from a format compatible with said second operating system to a format compatible with said first operating system;
g. said second program storing said results converted in the previous step into a second program stack having a portion thereof within said common memory;
h. said second program reactivating said first program via said CPU-to-CPU signal bus;
i. said first program fetching from said second program stack said results converted in step f hereof; and,
j. signaling said second operating system to terminate operation of said second program.

20. A method as in claim 19 wherein after said first program fetches said results from said first program stack, further including the steps of determining if more function calls are to be made to said second program.

21. A method as in claim 19 wherein said step of said first program signaling said second operating system to terminate operation further includes the steps of said second operating system determining if an attempt to terminate operation of said second program was successful; and, if so, returning an indication to said first operating system that termination was successful and returning control to a termination function in said first program.

* * * * *